United States Patent [19]
Smith et al.

[11] Patent Number: 5,317,725
[45] Date of Patent: May 31, 1994

[54] LANDMARK DATA ABSTRACTION PARADIGM TO DIAGNOSE DATA COMMUNICATION NETWORKS

[75] Inventors: Mark S. Smith; Scott A. Godlew, both of Colorado Springs, Colo.

[73] Assignee: Hewlett-Packard Company, Palo Alto, Calif.

[21] Appl. No.: 668,282

[22] Filed: Mar. 12, 1991

[51] Int. Cl.$^5$ .................. G06F 11/00; G01R 31/28
[52] U.S. Cl. .................. 395/575; 371/15.1; 395/908; 395/916
[58] Field of Search .............. 371/15.1; 395/575, 908, 395/916

[56] References Cited

U.S. PATENT DOCUMENTS

| | | | |
|---|---|---|---|
| 4,972,453 | 11/1990 | Daniel, III et al. | 371/15.1 |
| 5,090,014 | 2/1992 | Polich et al. | 371/15.1 |
| 5,107,500 | 4/1992 | Wakamoto et al. | 371/15.1 |
| 5,159,685 | 10/1992 | Kung | 395/575 |

FOREIGN PATENT DOCUMENTS

WO9005337 5/1990 PCT Int'l Appl. .

OTHER PUBLICATIONS

J. A. Zinky et al., "An Automatic Network Troubleshooter for Throughput Bottlenecks in Computer Networks", The Annual AI Systems in Govt. Conf., Mar. 1989, pp. 296-302.

P. Storey, "Diagnostics in the Extendable Integrated Support Environment (EISE)", IEEE 1989 National Aerospace and Electronic Conf. NAECON 1989, May 1989, pp. 1389-1395.

S. Godlew, "An Automated Approach to Network Fault Identification", 6th Word Telecommunications Forum, Oct. 1991, pp. 97-101.

Bruce L. Hitson, "Knowledge-Based Monitoring and Control of DIstributed Systems", Stanford University Computer Systems Laboratory Technical Report No. CSL-TR-90-414, Feb. 1990.

Primary Examiner—Charles E. Atkinson
Attorney, Agent, or Firm—Guy J. Kelley

[57] ABSTRACT

An expert system for diagnosing data communication networks. The expert system operates according to a landmark data abstraction paradigm, wherein landmarks are interpretations of network data. The landmarks are indicators of network problems. The expert system diagnoses the data communication networks by detecting landmarks and then interpreting the detected landmarks to determine whether network problems exist.

17 Claims, 36 Drawing Sheets

```
problem(
  name( cableNoisy )
  nlsName( 'Too Much Noise On Cable' )
  eventType( FaultEvent )
  frequency( 50 )
  severity( 50 )
  definition( '
    The cable has electrical signals other than those created
    by normal computer communications.  This will typically be
    60 Hz from improper grounding or running the cable past
    transformers.
  ' )
  solution( '
    Follow the grounding instructions for your network
technology
    very carefully.  Many LANs can only be grounded in a single
    location.  Also, do not run the cable by any sources of
    electrical fields, like transformers, flourescent lights,
    etc.
  ' )
  hypoText( 'Check for a noisy cable.
  ' )
  concText( 'Cable %?%cable% is too noisy.
  ' )
  parameters(
    [ cable unknown hypothesis
        'Cable Name'
        'some cable' ]
    [ initData unknown hypothesis
        'Initial Evidence Data'
        'some data' ]
  )
)

Copyright (c) 1991 Hewlett-Packard Company, all rights reserved.
```

```
problem(
   name( cableResistanceLow )
   nlsName( 'Cable Resistance is Too Low' )
   eventType( FaultEvent )
   frequency( 50 )
   severity( 50 )
   definition( '
     Low resistance will impact the circuitry of transceivers and
     prevent the accurate reception and transmission of signals.
     The required resistance for ThinLAN cable is 27 ohms
measured
     from any given tap on a cable with both ends terminated.
   ' )
   solution( '
     Replace terminators and cable segments with incorrect
resistance.
   ' )
   hypoText( 'Cable %?%cable% may have low resistance.
   ' )
   concText( 'The resistance of cable %?%cable% is%-% not% too
low.
   ' )
   parameters(
      [ cable unknown hypothesis
           'Cable Name'
           'some cable' ]
      [ initData unknown hypothesis
           'Initial Evidence Data'
           'some data' ]
   )
)

Copyright (c) 1991 Hewlett-Packard Company, all rights reserved.
```

```
measurement(
  name( collisionStat )
  nlsName( 'Collision Statistics' )
  eventType( InstrumentEvent )
  frequency( 50 )
  severity( 50 )
  definition( '
    This measurement provides Ethernet collision rates.
    Collisions are a normal part of Ethernet activity, but too
    many can be lead to a number of problems.
   ' )
  solution( '' )
  hypoText( 'Run the collision stat for %?%samples% samples.
   ' )
  concText( 'Collision stats: %?%results%.
   ' )
  parameters(
    [ samples integer hypothesis
        'Number of Samples to take'
        '' ]
    [ results integers conclusion
        'Sample Values'
        'some samples' ]
    [ data string conclusion
        'Capture Buffer Data'
        'some data' ]
  )
)

Copyright (c) 1991 Hewlett-Packard Company, all rights reserved.
```

```
landmark(
  name( excessiveCollisions )
  nlsName( 'Excessive Collisions' )
  eventType( ThresholdEvent )
  frequency( 50 )
  severity( 50 )
  definition( '
    Excessive collisions is determined when the collision rate
    excedes the baseline for a number of sample periods.
  ' )
  solution( '' )
  hypoText( 'Check for excessive collisions.
  ' )
  concText( 'Excessive collision levels: %?%excessLevels%.
  ' )
  parameters(
    [ excessLevels integers conclusion
        'Offending Samples'
        'some samples' ]
    [ data string conclusion
        'Capture Buffer Data'
        'some data' ]
  )
)
```

Copyright (c) 1991 Hewlett-Packard Company, all rights reserved.

```
symptom(
  name( noise )
  nlsName( 'Cable Noise' )
  eventType( TopologyEvent )
  frequency( 50 )
  severity( 50 )
  definition( '
    The user will measure the amount of noise on the cable.
    This will typically be 60 Hz from improper grounding or
    running the cable past transformers.
  ' )
  solution( '' )
  hypoText( 'Check for noise on cable %?%cable%.
  ' )
  concText( 'Cable %?%cable% has %?%noise% of noise.
  ' )
  parameters(
    [ cable string hypothesis
        'Cable Name'
        '' ]
    [ noise string conclusion
        'Noise Level'
        'some amount of noise' ]
  )
)
```
Copyright (c) 1991 Hewlett-Packard Company, all rights reserved.

```
symptom(
  name( poorPerformance )
  nlsName( 'Poor Performance' )
  eventType( ThresholdEvent )
  frequency( 50 )
  severity( 50 )
  definition( '
    The user believes there is poor performance between
    two nodes on the network.
  ' )
  solution( '' )
  hypoText( 'See if user thinks there is poor performance.
  ' )
  concText( 'There is poor performance between
    %?%sourceAddress% and %?%destinationAddress%.
  ' )
  parameters(
    [ sourceAddress node conclusion
        'Source Node'
        'some node' ]
    [ destinationAddress node conclusion
        'Destination Node'
        'some other node' ]
  )
)

Copyright (c) 1991 Hewlett-Packard Company, all rights reserved.
```

```
symptom(
  name( resistance )
  nlsName( 'Resistance' )
  eventType( TopologyEvent )
  frequency( 50 )
  severity( 50 )
  definition( '
    The user will measure the resistance of the cable with an
    appropriate instrument, such as an ohmmeter or Cable
Scanner.
  ' )
  solution( '' )
  hypoText( 'Find the resistance of cable %?%cable%.
  ' )
  concText( 'The resistance of cable %?%cable% is
%?%resistance%.
  ' )
  parameters(
    [ cable string hypothesis
        'Cable Name'
        '' ]
    [ resistance integer conclusion
        'Resistance Level'
        'some level of resistance' ]
  )
)
```

Copyright (c) 1991 Hewlett-Packard Company, all rights reserved.

```
hypothesize(
  name( monitor1 )
  cost( 50 )
  confidence( 100 )
  initialUrgency( 50 )
  explanation( '
    Noise on a cable will often activate the collision
    detection circuitry of MAUs.  Add ''Noisy Cable'' as
    an hypothesis, but further testing is required.
  ' )
  logicText( '
    cableNoisy( ?cable ?initData ) :- excessiveCollisions( ?level ?initData )
    baseline( cable ?cable )

' )
)
```

Copyright (c) 1991 Hewlett-Packard Company, all rights reserved.

```
backward(
  name( noise )
  cost( 50 )
  confidence( 100 )
  initialUrgency( 50 )
  explanation( '
    If lots of noise, then the cable is noisy.
  ' )
  logicText( '
    cableNoisy( ?cable ?initData ) :- noise( ?cable ?noise )
    gt( ?noise 2 )

' )
)

Copyright (c) 1991 Hewlett-Packard Company, all rights reserved.
```

```
hypothesize(
  name( complaint1 )
  cost( 50 )
  confidence( 100 )
  initialUrgency( 50 )
  explanation( '
    When the resistance goes low, it becomes more difficult
    for the collision detection circuitry to detect a
    collision.  The theoretical limit on throughput without
    collision detection is around 30 percent.  If traffic
    is already near this limit and more throughput becomes
    necessary, users will notice that their performance
    becomes noticeably bad.  Only further testing will
    confirm low resistance as an actual problem.
  ' )
  logicText( '
    cableResistanceLow( ?cable ?initData ) :- urgency(0 poorPerformance(?fromNode ?toNode))
  ' )
)

Copyright (c) 1991 Hewlett-Packard Company, all rights reserved.
```

```
backward(
  name( scanThin )
  cost( 50 )
  confidence( 100 )
  initialUrgency( 50 )
  explanation( '
    A thin coax LAN should have a resistance of 25 to 28 ohms
    when measured from any tap with no traffic.
  ' )
  logicText( '
    cableResistanceLow( ?cable ?initData ) :- topology( cableType ?cable ?type )
    eq( ?type ''ThinLan'' )
    resistance( ?cable ?resistance )
    lt( ?resistance 24 )
  ' )
)

Copyright (c) 1991 Hewlett-Packard Company, all rights reserved.
```

```
backward(
  name( excessiveCollisions1 )
  cost( 30 )
  confidence( 80 )
  initialUrgency( 50 )
  explanation( '
    Get the baseline for collisions.  Run the collision stats
    measurement and compare all levels to the baseline.  If
    there are more than a few values that excede the baseline,
    then conclude that there are excessive collisions.
  ' )
  logicText( '
    excessiveCollisions(?excessLevels ?data)   :- baseline(collisions ?threshold)
    collisionStat(10 ?results ?data)
    findall(?level
        and(member(?level ?results)
            ge(?level ?threshold))
        ?excessLevels)
    size(?excessLevels ?excessSize)
    ge(?excessSize 4)
  ' )
)

Copyright (c) 1991 Hewlett-Packard Company, all rights reserved.
```

LANDMARK DATA ABSTRACTION PARADIGM TO DIAGNOSE DATA COMMUNICATION NETWORKS

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS-REFERENCE TO OTHER APPLICATIONS

The following applications of common assignee contain some common disclosure, and are believed to have an effective filing date identical with that of the present application:

HYPOTHESIS AND CONCLUSION METHOD TO DIAGNOSE DATA COMMUNICATION NETWORKS (Ser. No. 07/667,913, filed Mar. 12, 1991).

AN EXPERT SYSTEM TO DIAGNOSE DATA COMMUNICATION NETWORKS (Ser. No. 07/668,992, filed Mar. 12, 1991.

BACKGROUND OF THE INVENTION

1. Field Of The Invention

The present invention relates generally to expert systems, and more particularly to expert systems for diagnosing data communication networks.

2. Related Art

There are at least three types of network problems that occur in data communication networks: physical problems, connectivity problems, and configuration problems.

Physical problems include problems which induce noise on the network, or which physically and/or electrically impede communication on the network. For example, physical problems include defective or incorrectly installed cables and connectors. Physical problems also include cables which are too long or which are broken.

Connectivity problems include problems with spanning devices. For example, connectivity problems include malfunctioning and incorrectly installed repeaters, bridges, and routers.

Configuration problems include problems with configuring and programming devices on the network. For example, a configuration problem occurs when multiple devices are programmed with the same network address. Another configuration problem occurs when a device is programmed with an incorrect broadcast address.

Tools are used to diagnose data communication networks to identify network problems. Protocol analyzers are such tools.

With the tools, human operators may manually diagnose data communication networks. For example, operators may use protocol analyzers to statistically monitor the data communication networks to measure traffic levels, including broadcast traffic levels, and to detect collisions and errors.

Based on network information acquired through using the tools, operators may identify network problems. The operators may correct the network problems once such network problems are identified.

However, there are problems with manually diagnosing data communication networks. For example, novice operators may not have the knowledge and experience to differentiate between important and superfluous information. Thus, novice operators may collect large amounts of unneeded information. Also, novice operators may lack sufficient knowledge and experience to effectively and efficiently operate the tools. Further, novice operators may lack sufficient knowledge and experience to accurately and effectively use network information to detect network problems. Expert operators having sufficient knowledge and experience to effectively, accurately, and efficiently collect data, operate the tools, and detect network problems may not be available to diagnose the data communication networks.

Further, manual diagnosis of data communication networks may result in sporadic monitoring of the networks since such manual diagnosis can be performed only when a human operator is available. Thus, even if expert operators are available, manual diagnosis is not conducive for periodic diagnosis of data communication networks.

A prior solution to the above manual diagnosis problem is to use known expert systems to automatically diagnose data communication networks. Such known expert systems automatically control the tools (such as protocol analyzers) to collect network data. Based on the network data, the known expert systems automatically identify network problems.

However, there are problems with using known expert systems to automatically diagnose data communication networks. First, known expert systems, like novice operators, often collect large amounts of unneeded information.

Second, known expert systems often analyze and interpret the collected data in an inefficient and ineffective manner.

Third, known expert systems do not allow for human operator interaction and control. With known expert systems, operators send commands to initiate the known expert systems. However, once initiated, the known expert systems execute until they complete the operators' commands. The operators do not interact with the known expert systems (once the expert systems are initiated) because the known expert systems often do not provide operators with status information. The operators do not control the known expert systems because, once initiated, the known expert systems do not respond to operator commands.

Providing such operator interaction and control is important for both novice operators and expert operators.

For novice operators, such interaction and control is important for learning purposes. By providing novice operators with interaction and control, novice operators will learn how to control the tools and how to identify network problems.

For expert operators, such interaction and control is important for greater accuracy in the diagnosis process. By providing expert operators with interaction and control, expert operators may draw on their experience and knowledge to either confirm or modify the expert systems, operation. Such confirmation and modification will ultimately result in a more accurate and effective diagnosis process.

Therefore, an expert system for automatically diagnosing data communication networks, which efficiently and effectively collects, analyzes, and interprets data, and which allows for human operator interaction and control, is required.

SUMMARY OF THE INVENTION

The present invention is directed to an expert system for diagnosing data communication networks. The expert system operates according to a landmark data abstraction paradigm. By operating according to the landmark data abstraction paradigm, the expert system of the present invention efficiently and effectively collects, analyzes, and interprets data.

According to the landmark data abstraction paradigm, landmarks are interpretations of network data. Additionally, the landmarks are indicators of network problems.

The expert system of the present invention diagnoses the data communication networks by detecting landmarks and then interpreting the detected landmarks to determine whether network problems exist.

Landmarks are detected by collecting network data and then interpreting the network data to determine whether the landmarks exist.

Alternatively, landmarks are detected by selecting one of the landmarks; collecting network data; interpreting the network data to determine whether the selected landmark exists; identifying related landmarks if the selected landmark exists; collecting additional network data; and interpreting the additional network data to determine whether the related landmarks exist.

In this patent document, the terms 'question,' 'problem,' and 'hypothesis' are synonymous unless stated otherwise. The terms 'subquestion' and 'landmark' are synonymous unless stated otherwise. The terms 'data' and 'answer' are synonymous unless stated otherwise.

Further features and advantages of the present invention, as well as the structure and operation of various embodiments of the present invention, are described in detail below with reference to the accompanying drawings, and in the claims. In the drawings, like reference numbers indicate identical or functionally similar elements.

BRIEF DESCRIPTION OF THE DRAWINGS

The present invention will be described with reference to the accompanying drawings, wherein:

FIGS. 21A, 21B, 21C, 21D, 21E, 21F, and 21G graphically illustrate a knowledge base containing data descriptors of a preferred embodiment of the present invention.

FIGS. 22A, 22B, 22C, 22D, and 22E graphically illustrate a knowledge base containing rules according to a preferred embodiment of the present invention.

DETAILED DESCRIPTION OF THE PREFERRED EMBODIMENTS

Table of Contents

1. The Landmark Data Abstraction Paradigm
2. Hypothesis and Verification Process
3. User Controlled Expert System
   3.1. Operating Environment
   3.2. High Level Structure and Operation
      3.2.1. Black Board
      3.2.2. Facilitator
      3.2.3. User Interface
      3.2.4. Generic Module
         3.2.4.1. Rule Module
         3.2.4.2. Measurement Module
         3.2.4.3. User Questions Module
         3.2.4.4. Remote Module
      3.2.5. Knowledge Base
      3.2.6. Databases
      3.2.7. Event Log
   3.3. Detailed Operation
      3.3.1. Initialization
      3.3.2. Diagnostic Operation
      3.3.3. Modules
         3.3.3.1. Generic Module
         3.3.3.2. Measurement Module
         3.3.3.3. User Questions Module
         3.3.3.4. Rule Module 3.3.4. User Interface
3.4. ARPA Requirements
3.5 ARPA Rules
1. The Landmark Data Abstraction Paradigm The present invention is directed to an expert system 102 for automatically diagnosing data communication networks 142. In a preferred embodiment of the present invention, the expert system 102 operates according to a landmark data abstraction paradigm.

Figure 23:
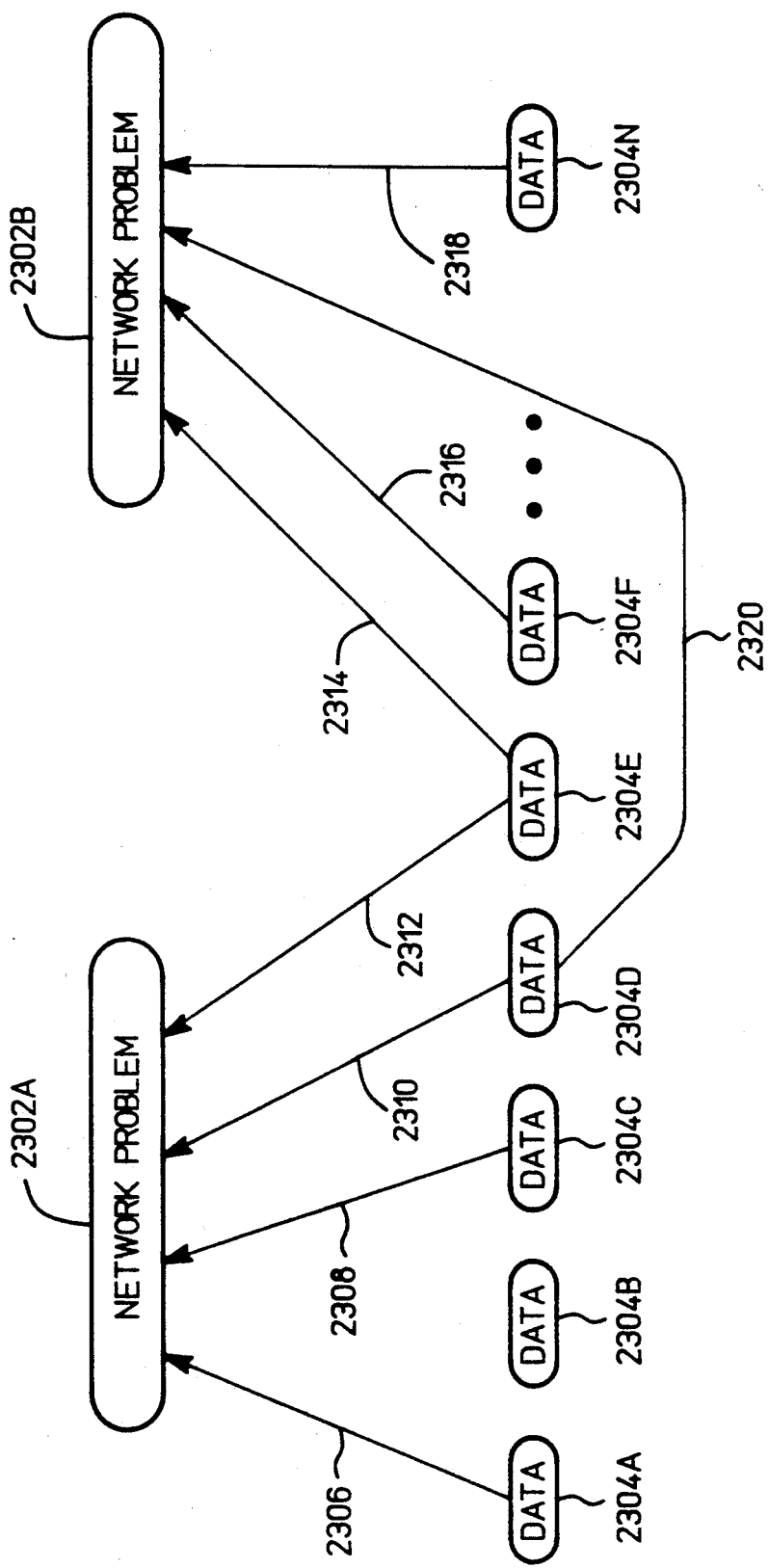
FIG. 23 illustrates a conventional method for diagnosing data communication networks.

FIG. 23 illustrates a conventional method for diagnosing data communication networks 142. Data 2304 represents network information which operators have collected by monitoring the data communication networks 142 (using various measurement devices, such as voltmeters, multimeters, spectrum analyzers, and protocol analyzers). The data 2304 represents raw, unanalyzed, and uninterpreted information (the data 2304 may embody some rudimentary analysis, but such analysis would only be for such purposes as formatting and display). Conventionally, operators are required to analyze and interpret the data 2304 to determine whether network problems 2302 exist.

The conventional method for diagnosing data communication networks 142 is flawed for the following reasons. First, an enormous amount of data 2304 must be collected, since it is not known a priori which data 2304 will be required to identify the network problems 2302. For example, only data 2304A, 2304C, 2304D, and 2304E are required to determine that network problem 2302A exists. Thus, if only network problem 2302A exists, then collecting data 2304B, 2304F, and 2304N is superfluous. However, according to the conventional method for diagnosing networks, it is not known a priori which network problems 2302 exists. Thus, data 2304B, 2304F, and 2304N must also be collected because it is not known a priori whether the network problem 2302B exists. Consequently, all data 2304 must be collected.

Second, the conventional method for diagnosing data communication networks 142 is flawed because all analysis and interpretation is performed by operators. Thus, after collecting the data 2304, the network problems 2302 may not be identified by the operators unless the operators are very knowledgeable and experienced. Due to the large volume of data 2304, even expert operators may be unable to identify network problems 2302 in an effective and efficient manner.

A conventional solution to the above problem is to use known expert systems to diagnose the data communication networks 142. The known expert systems are often automations of the conventional method illustrated in FIG. 23. Thus, the known expert systems suffer from the same flaws as the conventional method illustrated in FIG. 23.

Figure 24:
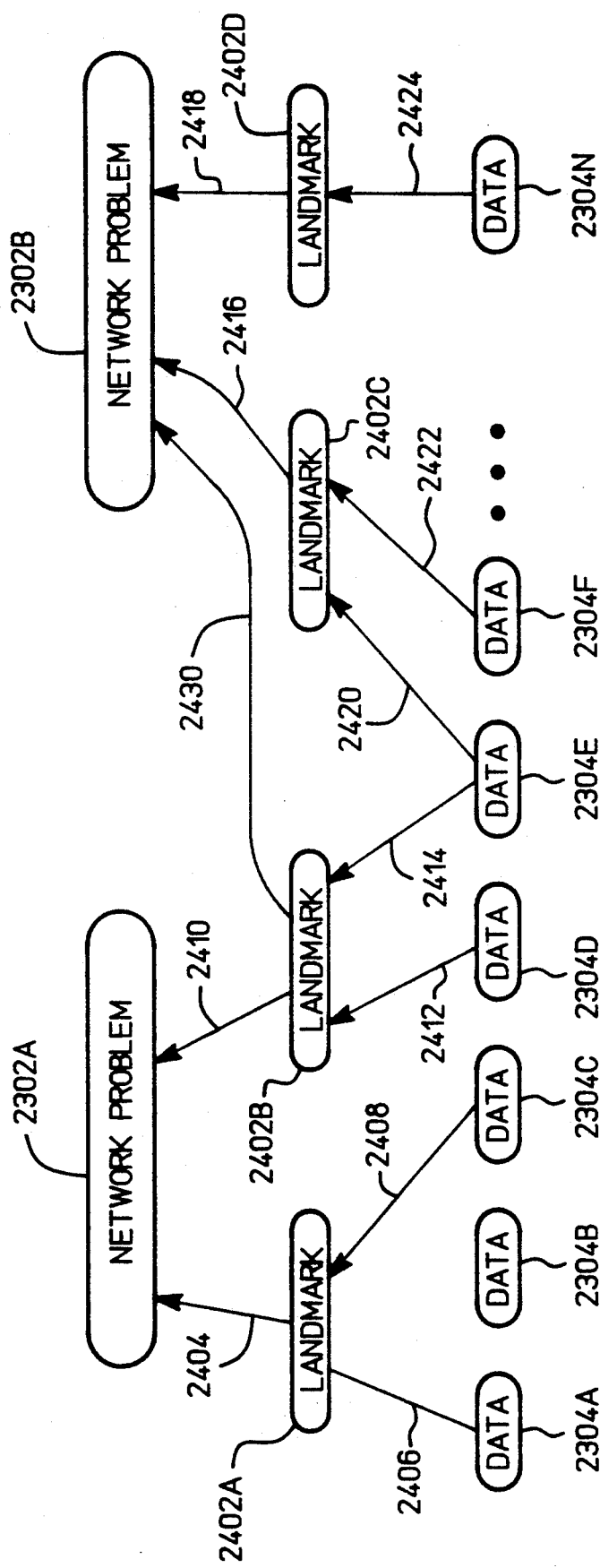
FIG. 24 illustrates a landmark data abstraction paradigm.

FIG. 24 illustrates a method for diagnosing data communication networks 142 which operates according to a preferred embodiment of the present invention.

According to the preferred embodiment of the present invention, an expert system 102 diagnoses networks 142 according to landmarks 2402. Landmarks 2402 are data abstractions. More precisely, landmarks 2402 are predefined interpretations of data 2304 which reflect useful characterizations of network problems 2302.

Landmarks 2402 represent an intermediate step between the raw, unanalyzed, and uninterpreted data 2304 and the network problems 2302. As shown in FIG. 24, landmarks 2402 are indicators of possible network problems 2302. For example, if landmark 2402A exists, then network problem 2302A may exist. If landmark 2402B exists, then either network problem 2302A or 2302B may exist.

Also, landmarks 2402 are confirmations of network problems 2302. For example, if the expert system 102 suspects that network problem 2302A exists, then the expert system 102 can confirm this suspicion by determining whether both landmarks 2402A and 2402B exist. If both landmarks 2402A and 2402B exist, then network problem 2302A exists. Otherwise, the network problem 2302A does not exist.

Landmarks 2402 exist if their associated data 2304 exist. Thus, the expert system 102 can determine whether landmarks 2402A and 2402B exist by determining whether data 2304A, 2304C, 2304D, 2304E exist.

Diagnosing data communication networks 142 according to landmarks 2402 solves the problems experienced by the above conventional method. First, using landmarks 2402 to diagnose data communication networks 142 greatly reduces the amount of data 2304 that must be collected. For example, the expert system 102 confirms a suspicion that the network problem 2302A exists by determining whether the landmarks 2402A and 2402B exist. To determine whether the landmarks 2402A and 2402B exist, the expert system 102 needs to collect only the data 2304A, 2304C, 2304D, 2304E. Thus, the expert system 102 does not need to collect all the data 2304.

Second, using landmarks 2402 to diagnose data communication networks 142 greatly reduces the analysis and interpretation of the data 2304 that is required during the actual diagnosis of the data communication networks 142. This improves the effectiveness and efficiency of the expert system 102.

By definition, the landmarks 2402 represent predefined interpretations of data 2304 which reflect useful characterizations of network problems 2302. In other words, the landmarks 2402 embody much of the analysis and interpretation of the data 2304 which is required to determine whether the network problems 2302 exist. Such analysis and interpretation are performed while the landmarks 2402 are being defined, rather than while the network 142 is actually being diagnosed. Thus, using the landmarks 2402 to diagnose the network 142 requires limited analysis and interpretation on the part of the expert system 102. The expert system 102 only needs to collect selected data 2304 to confirm that the landmarks 2402 exist. If the landmarks 2402 exist, then the network problems 2302 exist.

Figure 27:
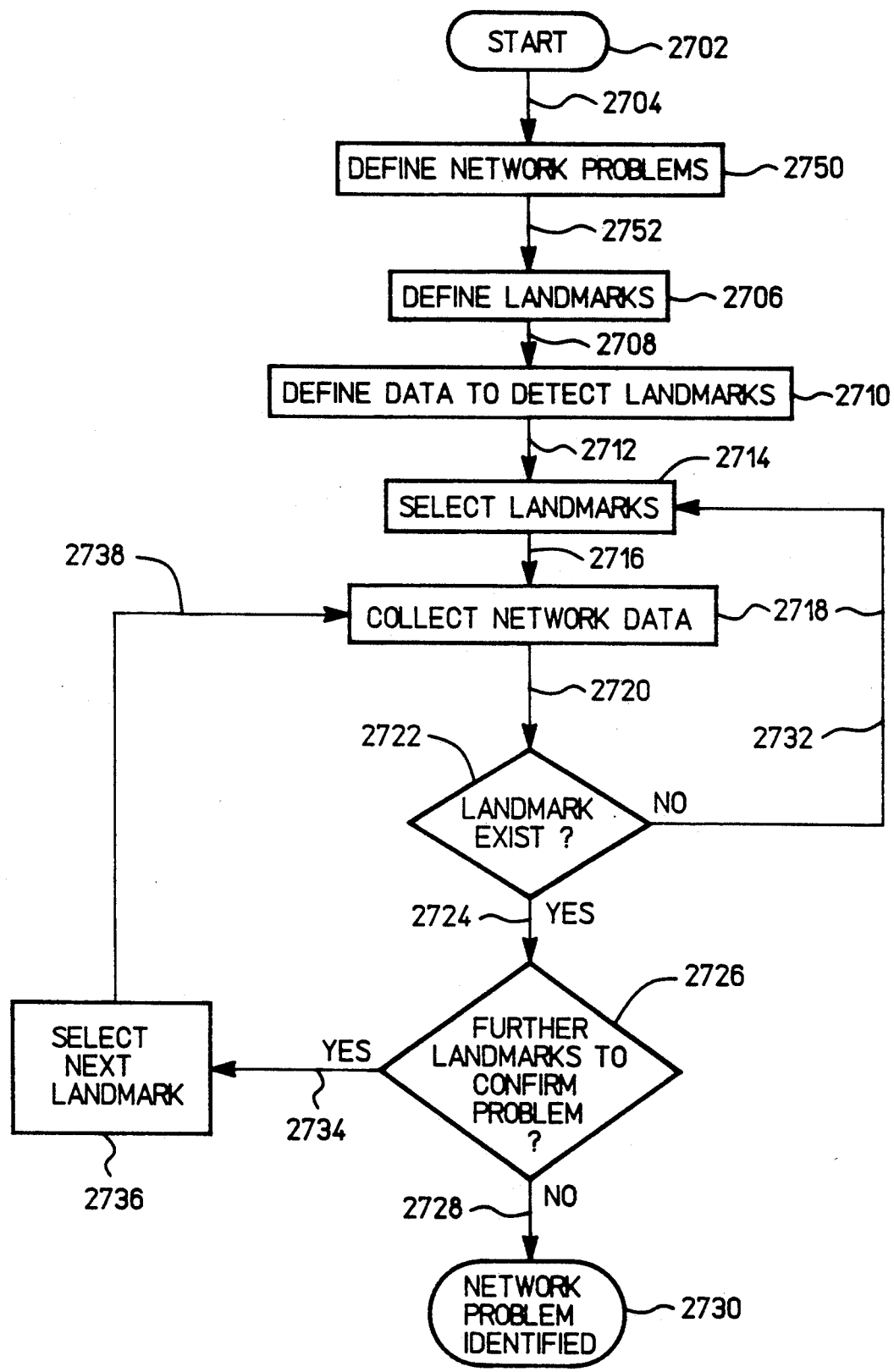
FIG. 27 illustrates a method for diagnosing data communication networks according to the landmark data abstraction paradigm.

The method in FIG. 24 for diagnosing data communication networks 142 according to the preferred embodiment of the present invention is more precisely illustrated in FIG. 27.

In step 2750, the network problems 2302 are defined.

In step 2706, the landmarks 2402 for the network problems 2302 are defined. In the preferred embodiment of the present invention, the landmarks 2402 include (1) network behavior that can be detected by operators (such landmarks 2402 are also called symptoms), and (2) network behavior that can be detected only by the expert system 102 using specialized tools, such as protocol analyzers 138. In either case, the landmarks 2402 are usually defined such that the landmarks 2402 indicate abnormal behavior on the data communication network 142. Such abnormal behavior is indicative of the network problems 2302.

Examples of landmarks 2402A could include (1) a connection dropping in the middle of a file transfer, (2)

network traffic which is much higher than normal, (3) a beaconing Token-Ring, (4) an ICMP redirect message, and (5) the number of protocol violations exceeding a predefined threshold. Other landmarks 2402A for a preferred embodiment of the present invention are identified in a section below.

The landmarks 2402A may vary depending on the specific type of data communications network 142 being diagnosed. Based on the discussion contained herein, those with ordinary skill in the art will be able to define the landmarks 2402 for their particular data communications network 142.

In step 2710, the data 2304 required to detect the landmarks 2402 are defined. The data 2304 may represent measurements performed with measurement devices, such as voltmeters, multimeters, spectrum analyzers, and protocol analyzers 138. The data 2304 may also represent queries asked of human operators. Based on the discussion contained herein, those with ordinary skill in the art will be able to identify the data 2304 which is required to detect the landmarks 2402.

In step 2714, the expert system 102 selects one of the landmarks 2402 to process. For example, referring to FIG. 24, assume the expert system 102 selects the landmark 2402A.

In step 2718, the expert system 102 collects the data 2304 necessary to verify or reject the existence of the landmark 2402 selected in step 2714. In the above example, the expert system 102 performs the necessary measurements and asks the necessary operator queries in order to obtain the data 2304A and 2304C.

In step 2722, the expert system 102 determines if the landmark 2402 selected in step 2714 exists (that is, the expert system 102 confirms the landmark 2402 selected in step 2714). This determination is based on the data 2304 collected in step 2718. (Although not shown in FIG. 27, this determination may also be based on the other landmarks 2402 that exist. That is, the expert system 102 may operate according to a hierarchy wherein certain landmarks 2402 exist if related data 2304 exists, and other landmarks 2402 exist if related landmarks 2402 exist.)

If the landmark 2402 does not exist, then the expert system 102 loops to step 2714 to process a landmark 2402 which is unrelated to the landmark 2402 just processed. In the example above, the landmark 2402A is unrelated to the landmarks 2402C and 2402D because they pertain to different network problems 2302A and 2302B, respectively.

If the landmark 2402 does exist, then in step 2726 the expert system 102 determines whether the landmark 2402 just processed is related to other landmarks 2402 which have not been processed. In the example above, the landmark 2402A is related to the landmark 2402B because the landmarks 2402A and 2402B pertain to the same network problem 2302A. Additionally, the landmark 2402B has not yet been processed.

If the landmark 2402 just processed is related to other landmarks 2402 which have not been processed, then the expert system 102 performs step 2736. In step 2736, the expert system 102 selects the next related, though unprocessed, landmark 2402 to process. The expert system 102 then loops to step 2718 to process the landmark 2402 selected in step 2736. Thus, by performing the control loop established by steps 2718, 2722, 2726, and 2736, the expert system 102 processes the related landmarks 2402 to determine whether the related landmarks 2402 exist.

If a sufficient combination of related landmarks 2402 pertaining to a network problem 2302 are confirmed, then the network problem 2302 is confirmed. This is represented by oval 2730.

Generally, it is not necessary to confirm all of the pertinent landmarks 2402 in order to confirm a network problem 2302. A network problem 2302 is confirmed when a sufficient combination of its pertinent landmarks 2402 are confirmed. For example, it may not be necessary to confirm landmarks 2402B, 2402C, and 2402D in order to confirm the network problem 2302B. A confirmation of the landmarks 2402B and 2402D, or perhaps even the landmark 2402C alone, may be sufficient to confirm the network problem 2302B.

The combinations for confirming the network problems 2302 are defined in rules. The expert system 102 operates according to the rules. The rules are discussed below.

2. Hypothesis and Verification Process

In a preferred embodiment of the present invention, an expert system 102 uses a hypothesis and verification process 2550 to diagnose data communication networks 142. The hypothesis and verification process 2550 is illustrated in FIG. 25.

According to the hypothesis and verification process 2550, data communication networks 142 are diagnosed by first hypothesizing the network problems 2302 (in step 2506), and then confirming or rejecting the network problem hypotheses (in step 2510). The network problems 2302 are hypothesized using forward rules. The network problem hypotheses are confirmed and rejected using backward rules. The forward and backward rules are discussed in sections below.

Figure 25:
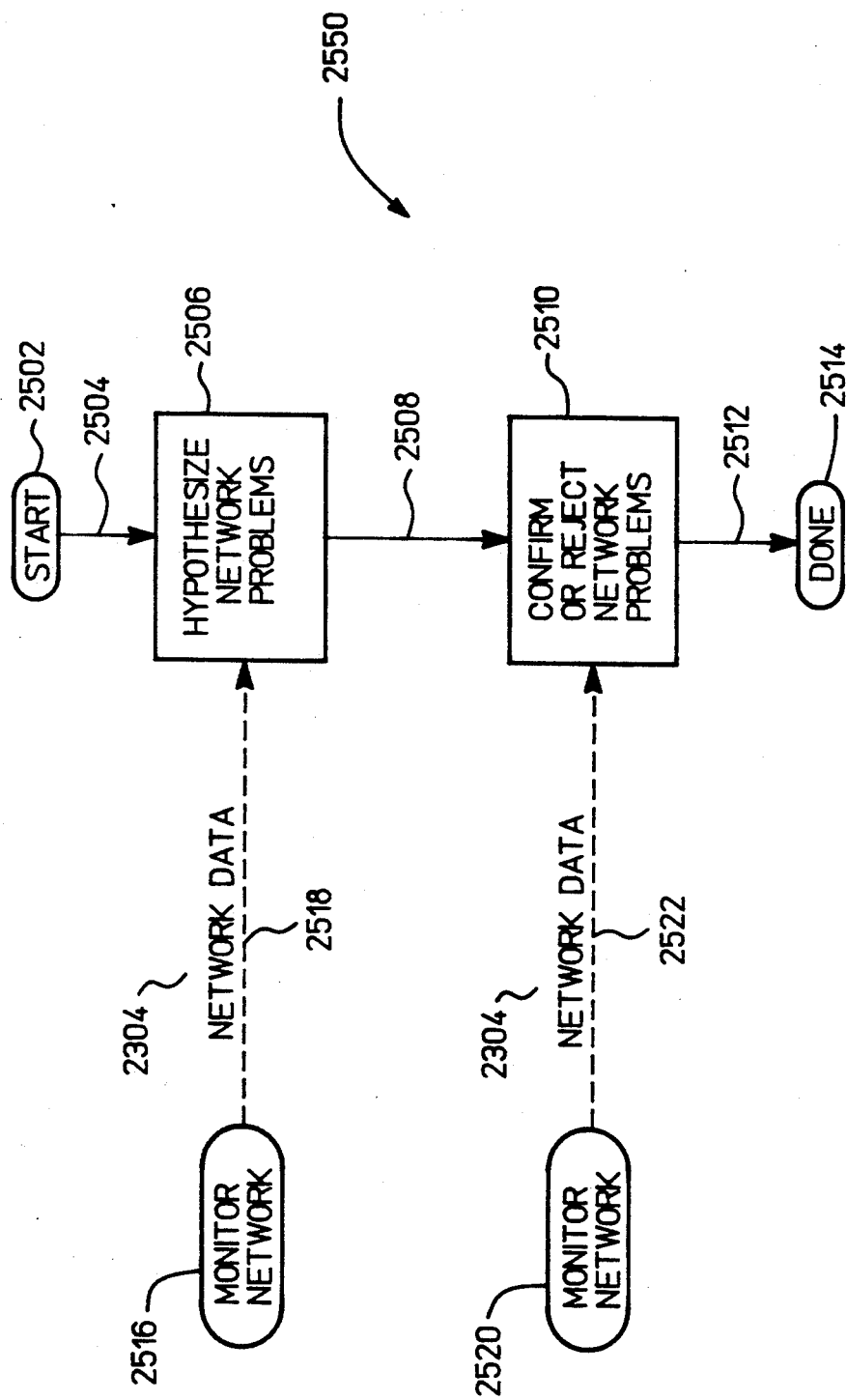
FIG. 25 illustrates a method for diagnosing data communication networks according to a hypothesis and conclusion process.

As shown in FIG. 25, the network data 2304 is collected by monitoring 2516 the network 142 in order to hypothesize the network problems 2302 (in step 2506). The network 142 is further monitored 2520 to collect additional network data 2304 in order to confirm or reject the network problem hypotheses (in step 2510).

Figure 26:
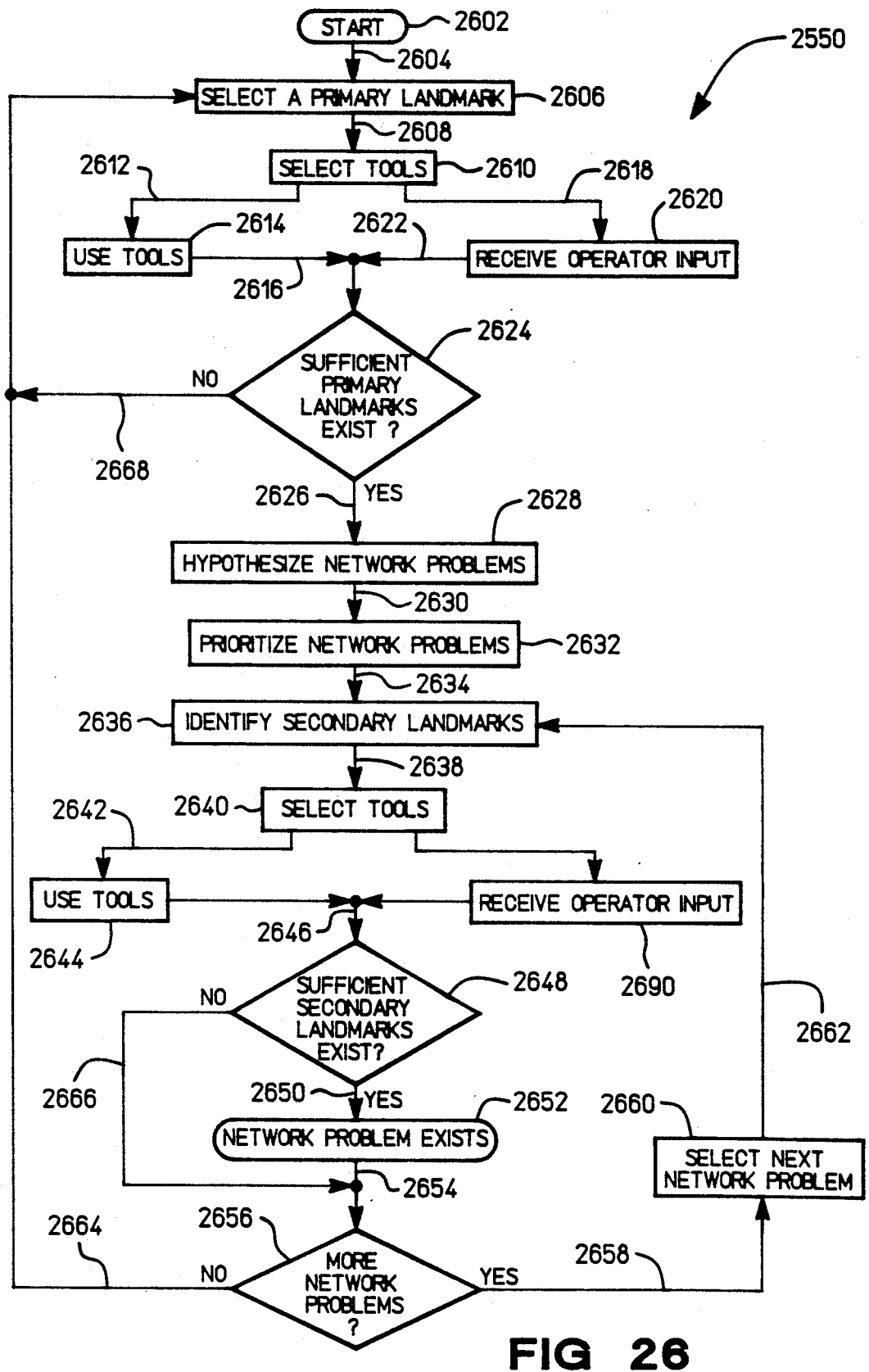
FIG. 26 illustrates in further detail the method for diagnosing data communication networks according to the hypothesis and conclusion process.

In a preferred embodiment of the present invention, the hypothesis and verification process 2550 operates according to the landmark data abstraction paradigm described above. FIG. 26 illustrates the hypothesis and verification process 2550 in greater detail, wherein the influence of the landmark data abstraction paradigm is apparent.

In step 2606, the expert system 102 of the present invention selects a primary landmark.

The landmarks 2402 are classified as either primary landmarks or secondary landmarks. Primary landmarks are those landmarks 2402 which are initial indicators of the network problems 2302. The primary landmarks are relatively convenient to confirm and reject. If a primary landmark exists, then there is a reasonable probability that the related network problem 2302 exists, and should be verified.

Secondary landmarks are used to verify the network problems 2302. The secondary landmarks are more reliable indicators of the network problems 2302 than the primary landmarks. However, the secondary landmarks are less convenient to confirm and reject.

The landmarks 2402 are classified as primary landmarks and secondary landmarks in order to further reduce the data collection process that is required to diagnose the network 142. To diagnose the network 142, the expert system 102 need only collect sufficient data 2304 to establish the existence of the primary landmarks. If the primary landmarks do not exist, then the expert system 102 need not collect additional data 2304 to establish the existence of the secondary landmarks. The expert system 102 need collect data to establish the existence of the secondary landmarks only if the primary landmarks exist.

Assume the landmark 2402B in FIG. 24 is a primary landmark. Assume also that the landmarks 2402A, 2402C, and 2402D are secondary landmarks. Thus, in step 2606, the expert system 102 selects landmark 2402B (multiple primary landmarks often exist).

In step 2610, the expert system 102 selects tools to determine whether the primary landmark selected in step 2606 exists. Such tools may include measurements by a protocol analyzer 138. In addition, operators are provided with opportunities to input landmark confirmations (this is represented by step 2620, described below). Such operator input can either be solicited (the expert system 102 asks the operators for input) or unsolicited (the operators input information without prior requests from the expert system 102). In FIG. 24, the expert system 102 selects sufficient tools to acquire data 2304D and 2304E.

The expert system 102 then performs either step 2614 or step 2620. The expert system 102 may also perform both steps 2614, 2620 in any order.

In step 2614, the expert system 102 uses the tools selected in step 2610 in order to acquire the data 2304 necessary to establish the existence of the selected primary landmark. In FIG. 24, the expert system 102 uses the tools to acquire data 2304D and 2304E.

In step 2620, as described above, the expert system 102 may receive unsolicited data or confirmed primary landmarks from the operator (step 2620 is performed only if the operator inputs such data). Thus, in step 2620, the operator may indicate that the selected primary landmark exists. If the operator inputs such information, then the expert system 102 need not perform steps 2610 and 2614 in order to establish the existence of the selected primary landmark.

As indicated by step 2620, the expert system 102 diagnoses the network 142 by either (1) confirming the secondary landmarks after confirming the primary landmarks, or (2) confirming the secondary landmarks after receiving confirmed primary landmarks from operators. Thus, the expert system 102 need not confirm the primary landmarks in order to detect the network problems 2302 when the expert system 102 receives confirmed primary landmarks from operators.

In step 2624, the expert system 102 determines whether the selected primary landmark exists. This determination is based on the data collected in steps 2614 and 2620. In FIG. 24, the primary landmark 2402B exists if data 2304D and 2304E exist. Whether the primary landmark 2402B exists may depend on comparing the data 2304D and 2304E against thresholds in the rules.

If the primary landmark 2402B does not exist, then the expert system 102 loops back to step 2606 in order to select another primary landmark 2606 to test. As noted above, contrary to the example shown in FIG. 24, multiple primary landmarks are often defined. Once all the primary landmarks have been tested, the expert system 102 repeats starting with the first primary landmark.

If the primary landmark does exist, then in step 2628 the expert system 102 hypothesizes the existence of one or more network problems 2302 based on the existence of the primary landmark. In FIG. 24, since the primary landmark 2402B exists, the expert system hypothesizes that the network problems 2302A and 2302B exist.

In step 2632, if multiple network problems 2302 were hypothesized in step 2628, then the expert system 102 prioritizes the hypothesized network problems 2302 for processing. The network problems 2302 are ordered according to priority. In a preferred embodiment of the present invention, the network problems 2302 are each assigned a frequency value and a severity value. These two values are used to determine priorities. Frequency refers to the rate at which the network problem 2302 occurs. Severity refers to the impact the network problem 2302 has on the network 142. A network problem 2302 with a high frequency value and a high severity value is assigned a high priority.

In step 2632, after prioritizing the hypothesized network problems 2302, the expert system 102 selects the hypothesized network problem 2302 with the highest priority for processing. In FIG. 24, assume the expert system 102 selects the network problem 2302 for processing.

In step 2636, the expert system 102 identifies the secondary landmarks associated with the hypothesized network problem selected for processing in step 2632. In FIG. 24, the expert system 102 identifies the secondary landmarks 2402C, 2402D.

In step 2640, the expert system 102 selects tools to determine whether the secondary landmark identified in step 2636 exist. In FIG. 24, the expert system 102 selects sufficient tools to acquire data 2304F and 2304N. Note that data 2304E was acquired previously. The expert system 102 then performs either step 2644 or step 2690. The expert system 102 may also perform both steps 2644, 2690 in any order.

In step 2644, the expert system 102 uses the tools selected in step 2640 in order to acquire the data 2304 necessary to establish the existence of the identified secondary landmarks. In FIG. 24, the expert system 102 uses the tools to acquire data 2304F and 2304N.

In step 2690, the expert system 102 may receive unsolicited data or confirmed secondary landmarks from the operator (step 2690 is performed only if the operator inputs such data). Thus, in step 2690, the operator may indicate that the selected secondary landmark exists. If the operator inputs such information, then the expert system 102 need not perform steps 2640, 2644 in order to establish the existence of the selected secondary landmark.

In step 2648, the expert system 102 determines whether the identified secondary landmarks exist. This determination is based on the data collected in steps 2644 and 2690. In FIG. 24, if data 2304F and 2304N exist, then secondary landmarks 2402C, 2402D exist.

As noted above, it is not necessary to confirm all of the identified secondary landmarks in order to confirm the associated network problem 2302. Rather, a network problem 2302 is confirmed when a sufficient combination of its pertinent landmarks 2402 are confirmed. These combinations are expressed as logical combinations (using OR and AND operators) and are contained in the rules in a knowledge base 238.

If sufficient combinations of the identified secondary landmarks do not exist, then the associated network problem 2302 does not exist. The expert system 102 takes control line 2666 and performs step 2656.

If sufficient combinations of the identified secondary landmarks do exist, then the associated network problem 2302 does exist. This is represented by oval 2652.

The expert system 102 informs the operator that the network problem 2302 exists. The expert system 102 then performs step 2656.

In step 2656, the expert system 102 determines whether further hypothesized network problems exist which have not yet been processed (recall that the hypothesized network problems were prioritized in step 2632).

If further hypothesized network problems remain, the expert system 102 performs step 2660. In step 2660, the expert system 102 selects the hypothesized network problem with the highest priority that has not been processed. The expert system 102 then loops back to step 2636.

If further hypothesized network problems do not remain, then the expert system 102 loops back to step 2606 in order to select another primary landmark 2606 to test.

The next section describes a specific expert system 102 which operates according to the landmark data abstraction paradigm and the hypothesis and verification process 2550.

3. User Controlled Expert System

In a preferred embodiment of the present invention, an expert system 102 for automatically diagnosing data communication networks 142 operates according to the landmark data abstraction paradigm and the hypothesis and verification process 2550 described above. The expert system 102 provides for operator interaction and control.

The following sections describe a preferred embodiment of the present invention.

3.1. Operating Environment

Figure 1:
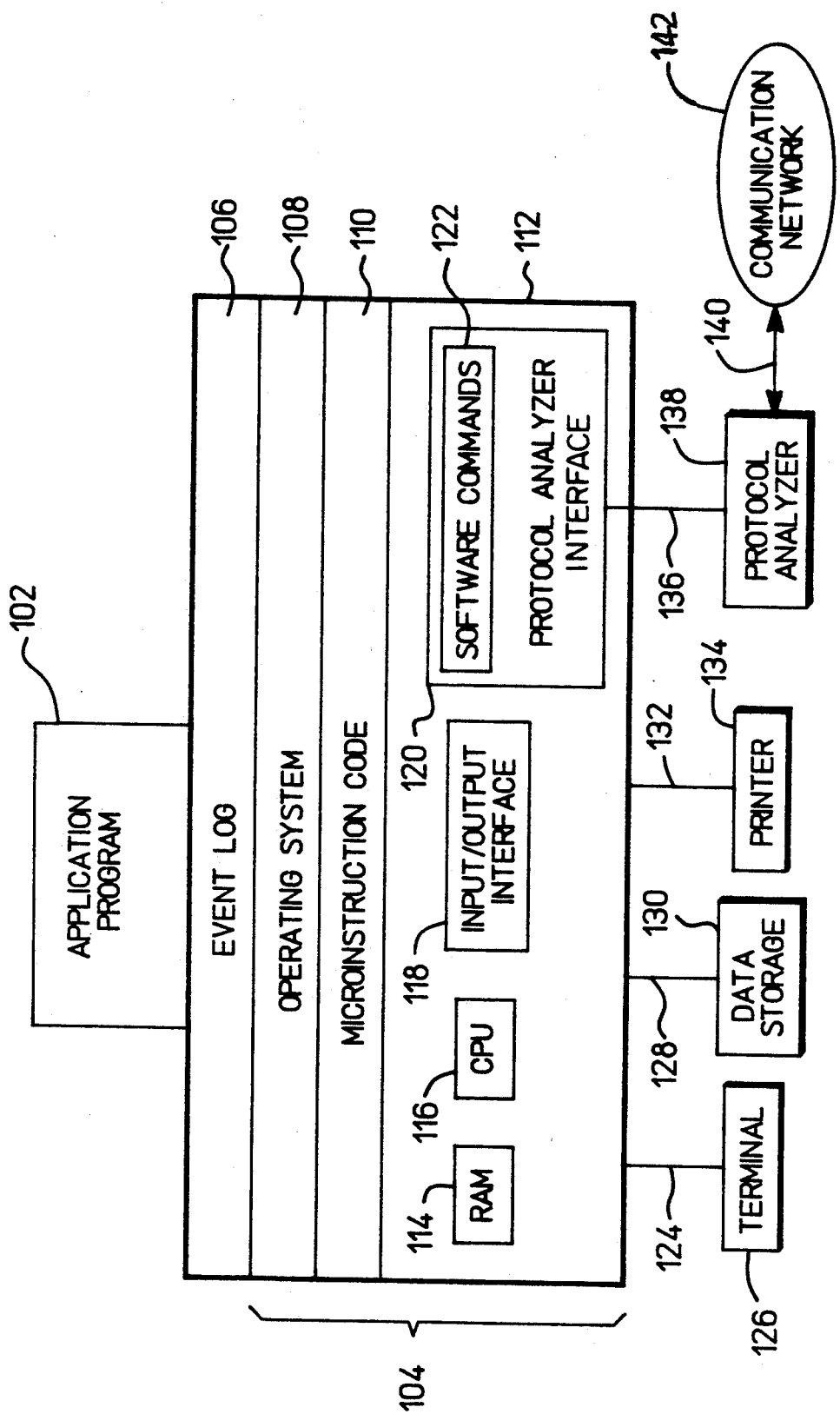
FIG. 1 illustrates an environment in which a preferred embodiment of the present invention operates.

FIG. 1 illustrates an environment in which a preferred embodiment of the present invention operates. The preferred embodiment of the present invention includes an application program 102 and an event log 106. The application program 102 represents an expert system which controls a protocol analyzer 138 for automatically diagnosing a data communications network 142.

The preferred embodiment of the present invention operates on a computer platform 104. The computer platform 104 includes certain hardware units 112 including a central processing unit (CPU) 116, a random access memory (RAM) 114, and an input/output interface 118. The computer platform 104 includes an operating system 108, and may include microinstruction code 110. Various peripheral components may be connected to the computer platform 104, such as a terminal 126, a data storage device 130, and a printing device 134.

The computer platform 104 also includes a protocol analyzer interface 120 having software commands 122 and a protocol analyzer 138.

In a preferred embodiment of the present invention, the computer platform 104 is a Hewlett-Packard (HP) Vectra personal computer or any International Business Machines (IBM) compatible personal computer based on the Intel 80286 or higher microprocessor. The operating system is the IBM or Microsoft or IBM/Microsoft-compatible disk operating system (DOS). The application program 102 is written in the Smalltalk/V computer programming language. The software commands 122 are written in the C, Forth, and assembly computer programming languages.

3.2. High Level Structure and Operation

Figure 2:
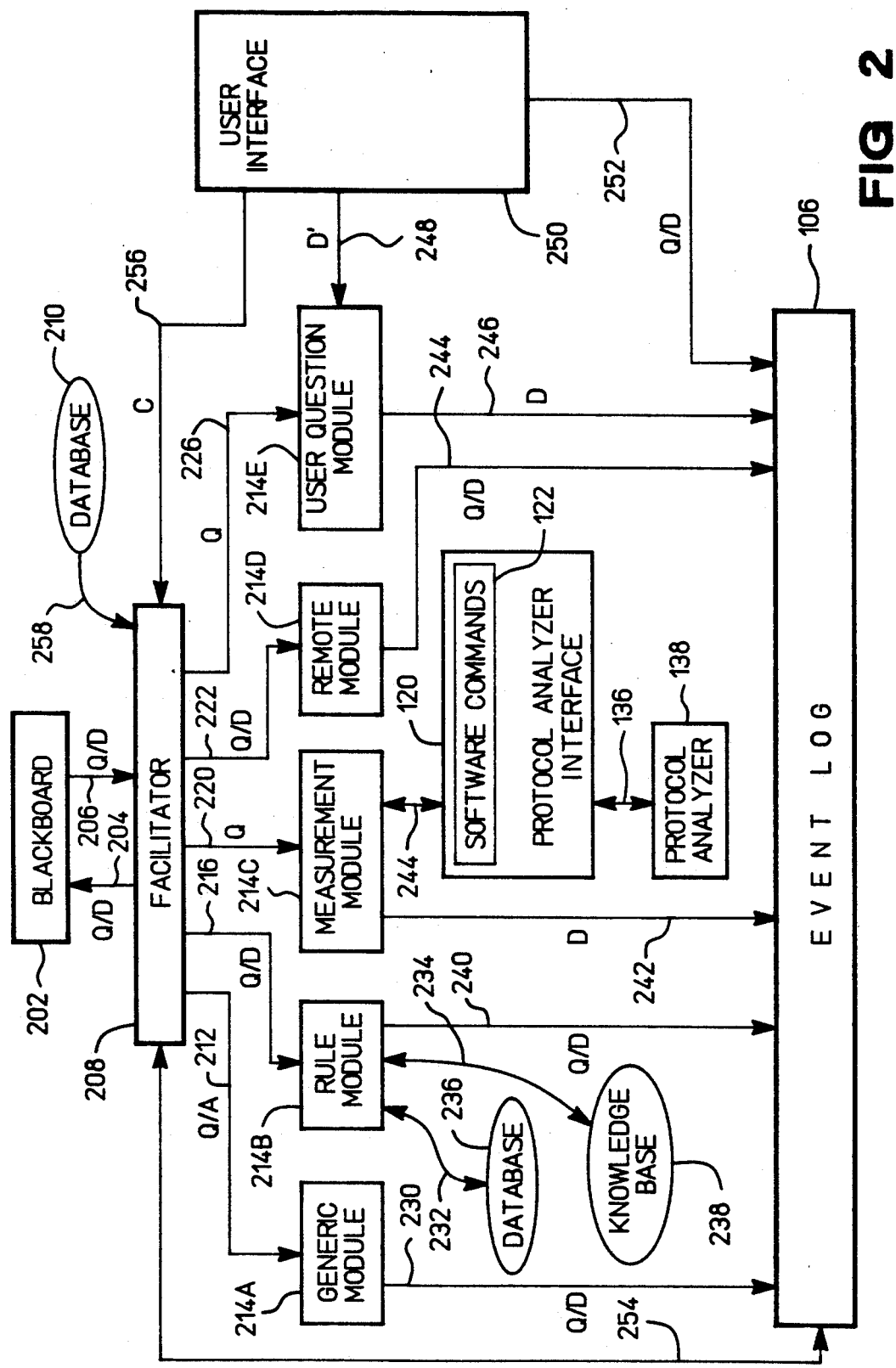
FIG. 2 illustrates a structure of a preferred embodiment of the present invention.

A structure of a preferred embodiment of the present invention is illustrated in FIG. 2. FIG. 2 also illustrates the interaction between the present invention and the event log 106, the protocol analyzer interface 120, and the protocol analyzer 138. FIG. 2 further illustrates the transfer of commands, questions, and data between components (also called entities) of the present invention, the event log 106, the protocol analyzer interface 120, and the protocol analyzer 138. In FIG. 2, commands, questions, and data are represented by C, Q, and D, respectively.

As noted above, the preferred embodiment of the present invention includes an event log 106 and an application program 102. The application program 102 includes a black board 202, a facilitator 208, a user interface 250, and modules 214. The modules 214 are generally represented by a generic module 214A. The modules 214 include a rule module 214B, a measurement module 214C, a remote module 214D, and a user questions module 214E.

The preferred embodiment of the present invention also includes a knowledge base 238 and databases 210, 236.

The preferred embodiment of the present invention operates as follows. The event log 106 receives a question. For example, the question may be: "Is cable XYZ operating within acceptable levels?".

The event log 106 sends the question to the facilitator 208, and the facilitator 208 posts the question on the blackboard 202. There may be multiple questions on the blackboard 202.

Periodically, the facilitator 208 selects the most urgent question on the blackboard 202 and polls the modules 214 to identify the module 214 which is best capable of answering the selected question. Then, the facilitator 208 instructs the identified module 214 to answer the selected question.

In answering the selected question, the identified module 214 may ask subquestions. For example, if the selected question is "Is cable XYZ operating within acceptable levels?," the identified module 214 may ask the subquestions "Is there excessive noise on cable XYZ" and "Is there a break in the electrical continuity of cable XYZ." These subquestions are posted on the blackboard 202 via the event log 106 and facilitator 208, and the facilitator 208 identifies the best modules 214 to answer the subquestions. The modules 214 answering the subquestions may not be the same module asking the selected question. The module 214 answering the selected question may be the rule module 214B. The modules 214 answering the subquestions may be the measurement module 214C and the user questions module 214E.

The identified modules 214 answer the subquestions and post the subquestion answers on the blackboard 202 via the event log 106 and the facilitator 208. The facilitator 208 instructs the module 214 answering the selected question (that is, "Is cable XYZ operating within acceptable levels?") that the subquestion answers are available on the blackboard 202. The module 214 uses the subquestion answers to answer the selected question.

During the above operation of the present invention, the expert system 102 interacts with human operators by sending status and progress messages to the human operators via the user interface 250. Essentially, all questions and data sent to the event log 106 are also sent to the user interface 250 for display to the human operators.

Additionally, human operators may control the expert system 102 at any time during the above operation of the present invention. For example, operators may send questions to the expert system via the user interface. Also, operators may override the facilitator's selection of the most urgent question on the blackboard. Further, operators may alter the subquestions generated by the modules 214 selected to answer questions.

The components of the present invention are further described in the sections below, and in Section 3.3, which describes the operation of the present invention.

3.2.1. Black Board

The blackboard 202, in conjunction with the facilitator 208, is a communication medium through which the modules 214 communicate and cooperate with each other. The modules 214 perform specialized functions in the overall diagnostic process. For example, the measurement module 214C accesses the protocol analyzer 138 for measurement data on the network. The user questions module 214E queries operators for data regarding the network.

However, a single module 214 cannot alone diagnose the network 142. This is true because the modules 214 cannot individually generate all the information that is required to diagnose the network 142. For example, the user questions module 214E cannot access the protocol analyzer 138 for measurement data on the network. Thus, the modules 214 collectively diagnose the network 142 by generating information and posting the information on the blackboard 202. The modules 214 consume the information from the blackboard 202 in order to diagnose the network 142.

As shown in FIG. 2, the facilitator 208 controls access to and from the blackboard 202. This is described further in the next section.

3.2.2. Facilitator

The facilitator 208 identifies appropriate modules to produce information to satisfy requests (that is, to answer questions). Questions in the blackboard 202 are sorted according to relative importance and urgency. The facilitator 208 identifies the most important question in the blackboard 202. Then, the facilitator 208 polls the modules 214 to identify the module 214 that is best able to answer the identified question. The facilitator 208 then instructs the identified module 214 to answer the identified question.

3.2.3. User Interface

The user interface 250 provides an interface between the expert system 102 of the present invention and human operators. Via the user interface 250, the expert system 102 interacts with operators by providing operators with status and update messages regarding the questions which are being answered by the expert system 102. Also via the user interface 250, operators control the operation of the expert system 102 by sending appropriate commands and data to the expert system 102.

3.2.4. Generic Module

This section describes a generic module 214A. The expert system 102 of the present invention accommodates many different types of modules 214, such as a rule module 214B, a measurement module 214C, a remote module 214D, and a user questions module 214E (these specific modules 214 are described in the sections below). In fact, the expert system 102 of the present invention accommodates any module that generally conforms to the characteristics of the generic module 214A as described in this section.

The generic module 214A performs the following functions. First, the generic module 214A may receive questions and data from the facilitator 208.

Second, the generic module 214A may send data and questions to the facilitator 208.

Third, the generic module 214A receives a poll from the facilitator 208 regarding a pending question. In response to the poll, the generic module 214A provides an estimate to the facilitator 208 regarding the generic module's 214A effectiveness in answering the pending question.

Fourth, if the generic module 214A is selected by the facilitator 208 to answer a pending question, then the generic module 214A processes the pending question to produce an answer. In processing the pending question, the generic module 214A may produce subquestions which are posted to the blackboard 202 via the event log 106 and facilitator 208.

In performing the above functions, the generic module 214A and facilitator 208 may not exchange actual data and questions. Rather, the generic module 214A and facilitator 208 may exchange pointers to actual data and questions posted on the blackboard 202. To access the blackboard 202, the generic module 214A must register with the blackboard 202. If the generic module 214A requires answers from the blackboard 202, then the generic module 214A registers as a consumer. If the generic module 214A provides answers to the blackboard 202, then the generic module 214A registers as a producer. The generic module 214A may register as both a consumer and producer.

The consumer modules 214 use data on the blackboard 202 provided by other modules 214 (that is, from producer modules 214) to answer questions. The producer modules 214 provide data to the blackboard 202 for use by other modules 214 (that is, by consumer modules 214) in answering questions. A producer module 214 that is also a consumer module 214 uses data provided by other producer modules 214 to generate data for use by other consumer modules 214.

The specific functions of the modules 214 may vary from those of the generic module 214A depending on the specific responsibilities and capabilities of the specific modules 214. Examples of modules 214 which are accommodated by the expert system 102 of the present invention are discussed in the following sections.

3.2.4.1. Rule Module

The rule module 214B is a consumer and producer. The rule module 214B is an inference engine which operates according to the rules in the knowledge base 238. The rule module 214B manages, schedules, and applies the rules in the knowledge base 238 to answer and pose questions. The rule module 214B receives responses to questions and manages the continuation of pending rules using the responses.

When the rule module 214B is asked a question, several rules from the knowledge base 238 may address the question. The rule module 214B activates the best rule for answering the question. The rule module 214B may activate further rules to satisfy the request (that is, to answer the question). Only backward chaining rules are handled in this manner.

In the expert system of the present invention, there can be any number of logical rule modules 214B, wherein each rule module 214B manages the execution of a rule from the knowledge base 238. The rule modules 214B are categorized into hypothesis (forward) modules, verification (backward) modules, and landmark modules. The rule modules 214B are categorized according to the rules the rule modules 214B are executing.

Context modules are consumers. Context modules request information in order to provide guidance for the problem solving process. Context modules set top level goals by actively forward chaining to make hypotheses about problems.

Problem modules are consumers and producers. Problem modules investigate hypothesized problems by responding to requests from the context modules. These problems are investigated by requesting other information (such as landmarks) to infer its response.

Landmark modules are consumers and producers. Landmark modules are similar to the problem modules, but measurements and other information are used to infer landmarks. A landmark is a prerequisite that must be satisfied to hypothesize and confirm a problem with the network 142.

3.2.4.2. Measurement Module

The measurement module 214C is a producer and provides the interface between the expert system 102 and the protocol analyzer 138.

The measurement module 214C receives requests (also called questions) for measurements from the facilitator 208. The measurement module 214C converts the requests into actual selection, configuration, and execution commands. The measurement module 214C sends the commands to the protocol analyzer interface 120. The commands invoke selected software commands 122 of the protocol analyzer interface 120. The software commands 122 cause the protocol analyzer 138 to perform the measurement originally requested.

The protocol analyzer 138 returns the measurement results to the measurement module 214C via the protocol analyzer interface 120. The measurement module 214C converts the measurement results into a form suitable for the blackboard 202.

The requests to the measurement module 214C have bound variables corresponding to the configuration of the requested measurement, and unbound variables corresponding to the results of the requested measurement. The predicate name is the actual measurement name. Otherwise, a direct mapping is possible. The responses from the measurement module 214C consist of predicates with bindings on all variables corresponding to the measurement results, and the variables holding the configuration are unchanged.

3.2.4.3. User Questions Module

The user question module 214E provides an interface to operators. The user question module 214E receives requests for information from the facilitator 208 and transforms the requests into questions that can be asked of the operators. Then, the user question module 214E transforms user responses into a form suitable to satisfy the requests.

3.2.4.4. Remote Module

The remote module 214D allows remote systems to participate in the problem solving process. For example, the remote module 214D may receive a question from the facilitator 208. To answer the question, the remote module 214D may access a remote system for information regarding the interaction between the remote system and the network 142. Such information may be helpful in diagnosing the network 142.

The remote module 214D may be a consumer and/or a producer.

The remote system may be part of a higher level problem solver which consumes information from the expert system 102 of the present invention. Alternatively, the remote system may produce information that allows the expert system 102 to proceed in problem solving.

3.2.5. Knowledge Base

The knowledge base 238 includes rules that are used by the rule module 214B. The rule module 214B infers conclusions based on existing/requested facts by using the rules in the knowledge base 238. The rules support scheduling using cost and certainty factors and also support propagation list searches. The rules are discussed further in sections below.

3.2.6. Databases

The expert system 102 contains the databases 210, 236.

The database 210 contains information regarding descriptors of data. The descriptors of data are discussed in a section below.

The database 236 includes a baseline database and a topology database. The baseline database contains information regarding baselines and nominal conditions in the network 142. The baselines are normal values for certain parameters of a particular network. These values vary among networks. Average collision rate, traffic rate, broadcast rate, external traffic rates, and typical routes are examples of baselines. When the current value of these parameters differ significantly from the baselines, landmarks related to potential problems on the network are identified.

The topology database contains information regarding the topology of the network 142, such as node locations, cable connections, and orientation of spanning devices.

3.2.7. Event Log

The event log 106 receives questions and data from the components of the expert system 208. The event log 106 also receives questions and data from the operators via the user interface 250.

The event log 106 transfers received questions and data to the facilitator 208. During an initiation process (described in a section below), the facilitator 208 specifies to the event log 106 the type of questions and data which the event log 106 should forward to the facilitator 208.

The questions and data which the event log 106 receives are transferred to the user interface 250 for display to the operators. In this manner, the expert system 102 interacts with the operators by displaying progress and status information for the operators. The type of questions and data which are sent to the user interface 250 for display to the operators may be specified during the initiation phase.

3.3. Detailed Operation

The operation of the expert system 102 while diagnosing data communication networks 142 is described in detail in this section.

3.3.1. Initialization

Figure 3:
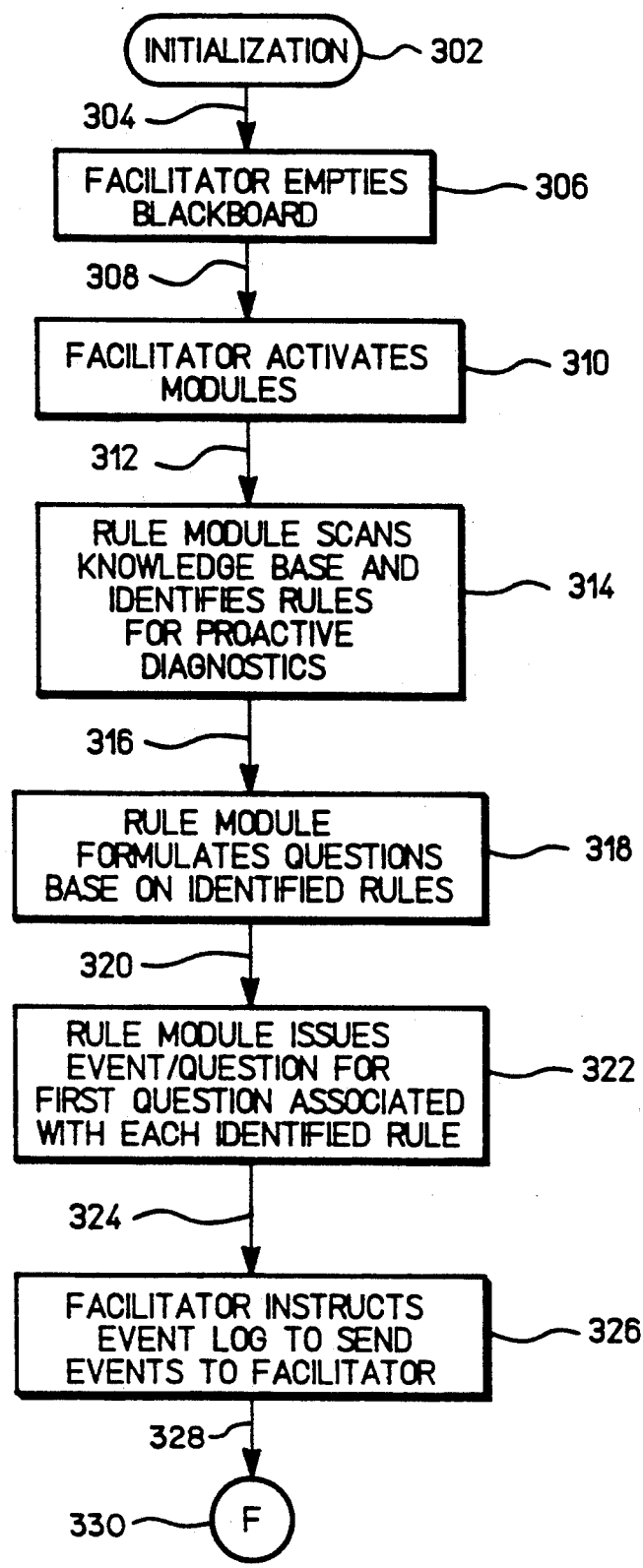
FIG. 3 illustrates a flowchart of an initialization process for a preferred embodiment of the present invention.

FIG. 3 presents a flowchart of an initialization process for the expert system 102 of the present invention. The initialization process is executed by the facilitator 208 in response to 'startup' and 'reset' commands to the facilitator 208 from an operator via the user interface 250.

In step 306 of the initialization process, the facilitator 208 empties the blackboard 202 of all questions and data.

In step 310, the facilitator 208 activates the modules 214. The manner in which the modules 214 respond to such activation depends on the functionality and responsibility of the particular module 214.

For example, the operation of the rule module 214B in response to such activation relates to proactive diagnosis.

The expert system 102 performs reactive diagnosis and proactive diagnosis. Reactive diagnosis refers to diagnosis of the network 142 by the expert system 102 in response to a question from an operator. For example, the operator may ask the expert system 142 (via the user interface 250) the following question: "Why doesn't my terminal connect to the communication network?". The expert system 102 diagnoses the network 142 in order to answer the operator's question. Such diagnosis is called reactive because it is performed in response to operator questions.

Proactive diagnosis refers to diagnosis of the network 142 by the expert system 102 on the volition of the expert system 102 alone. Proactive diagnosis is not performed in response to operator questions. Rather, proactive diagnosis represents periodic and automatic diagnosis of the network 142 by the expert system 102 without intervention of operators (unless information is required from the operators via the user questions module 214E).

Proactive diagnosis is initiated using forward rules that establish subquestions that can be addressed by specific measurements. A forward rule is one which yields a problem question if the conditions of the forward rule are satisfied. With respect to proactive diagnoses, the yielded question represents a hypothesis of a network problem that must be confirmed to determine if the network problem actually exists. Thus, forward rules are also called hypothesize rules.

For example, a forward rule R1 may have a condition C1="Are there excessive collisions?". If C1 is true, then R1 may yield the hypothesis "The cable is noisy" or equivalently Q1="Is the cable noisy?". The expert system 102 must answer Q1 in order to confirm the hypothesis generated by R1.

Note that forward rules cannot identify network problems with a high degree of reliability. Forward rules yield hypotheses, not conclusions. Thus, forward rules are not used to confirm that network problems exist. Rather, forward rules are used to hypothesize that network problems may exist. Forward rules use landmarks to lead the way to network problems (as landmarks lead a traveler to a region), but forward rules individually cannot confirm network problems (as a single landmark cannot ordinarily lead a traveler to the ultimate destination). The landmark data abstraction paradigm is discussed in a section above.

The forward rules contain passive components and active components. Reactive diagnosis is performed using forward rules having passive components. A passive component is one which the expert system 102 does not process until an operator input is received. For example, FIG. 22C illustrates a forward rule having a passive component. In FIG. 22C, the expert system 102 does not process the 'urgency' statement until an operator inputs a 'poorPerformance' complaint. Passive components represent user symptoms.

Proactive diagnosis is performed using forward rules having active components. An active component is one which the expert system 102 can process without having operator input.

For both reactive and proactive diagnosis, backward rules are used to verify the problems which are hypothesized by the forward rules.

Thus, during the initialization process shown in FIG. 3, the rule module 214B initiates the proactive diagnosis. Specifically, in step 314, the rule module 214B scans the knowledge base 238 and identifies the forward rules related to proactive diagnosis.

In step 318, the rule module 214B determines the questions which are related to the forward rules identified in step 314.

In step 322, the rule module 214B generates and issues events relating to the first questions for each of the forward rules identified in step 314. The events are messages which travel through the expert system 102. The events may contain questions (and are then called event/questions) or answers (and are then called event/answers). In this patent document, the terms 'event/questions' and 'questions' are used interchangeably. The terms 'event/answers' and 'answers' are used interchangebly.

The event/questions are posted on the blackboard 202 via the event log 106 and facilitator 208. The manner in which these questions (and underlying forward rules) are processed in a proactive manner are described in a section below with reference to FIG. 9.

In step 326, the facilitator 208 specifies to the event log 106 that all questions and data should be sent to the facilitator 208.

3.3.2. Diagnostic Operation

The operation of the expert system 102 of the present invention while diagnosing data communication networks 142, following initialization 302, is described in this section.

Figure 4:
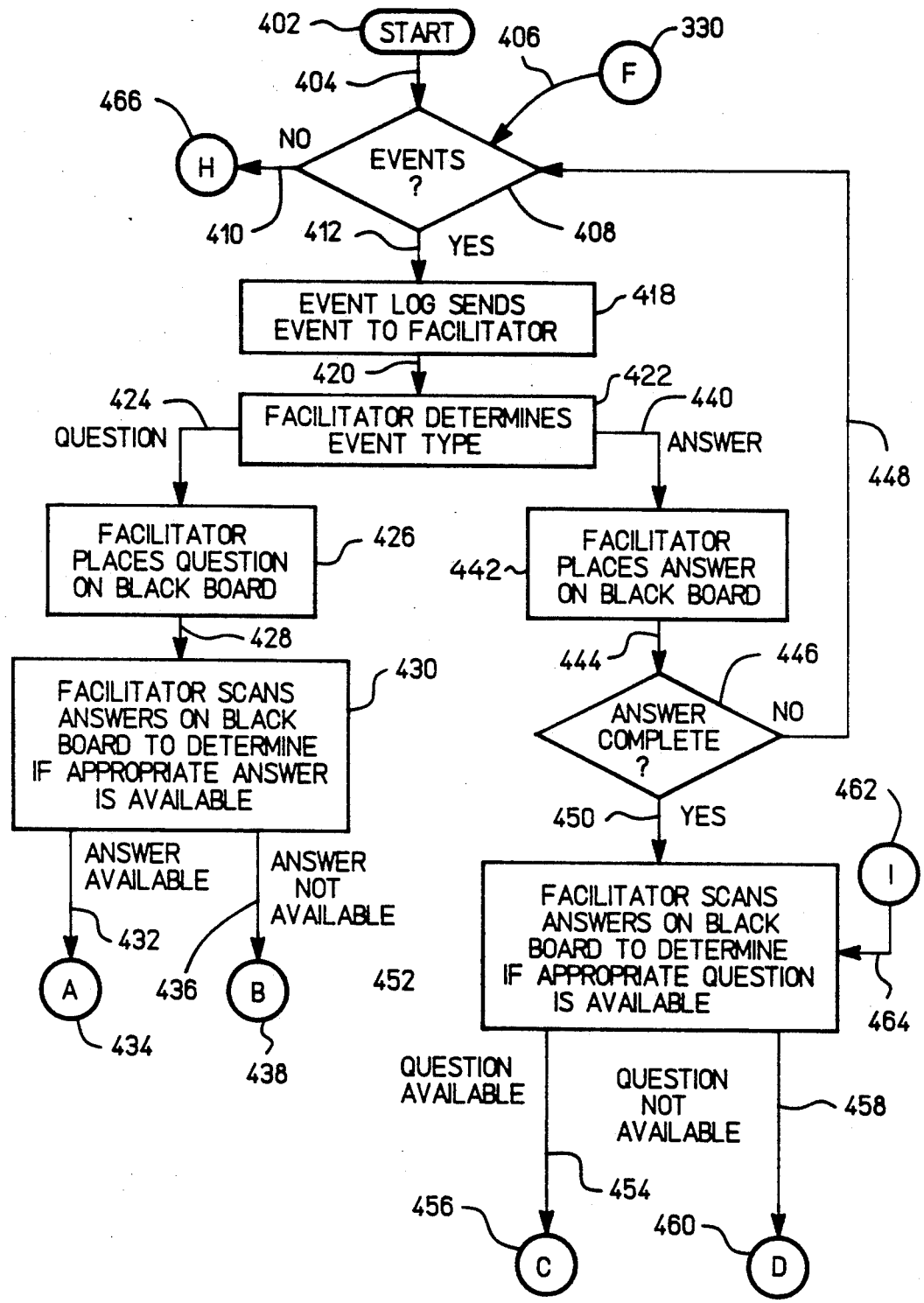
FIG. 4 illustrates a first operational flowchart of a preferred embodiment of the present invention.

Referring first to FIG. 4, following initialization 302 the expert system 102 begins diagnosing the data communication network in step 402.

In step 408, the expert system 102 determines if events have arrived at the event log 106. Events are messages which are passed between the entities of the expert system 102 (as noted above, the entities in the expert system 102 are the components shown in FIG. 2). Events may contain questions or answers to questions. For example, an event/question may be "How many collisions are occurring on cable XYZ?". A corresponding event/answer may be "10 collisions/second are occurring on cable XYZ."

Entities in the expert system 102 communicate among themselves by sending events to the event log 106. The event log 106 sends the events to the facilitator 208 on line 254, and the facilitator 208 distributes the events to the appropriate entities. Thus, if in step 408 the event log 106 determines that events exist in the event log 106, then in step 418 the event log 106 sends the events to the facilitator 208.

The remaining steps in FIG. 4 (other than step 466) illustrate the manner in which the facilitator 208 distributes the events to the appropriate entities after receiving the events from the event log 106.

In step 422, the facilitator determines if the event is a question (that is, an event/question) or an answer (that is, an event/answer). If the event is an event/question, then the facilitator 208 follows control path 424. If the event is an event/answer, then the facilitator 208 follows control path 440.

If the event is an event/question, then in step 426 the facilitator 208 places the event/question on the blackboard 202. As noted above, the blackboard 202 is a storage area in RAM 114 for temporarily storing events.

In step 430, the facilitator 208 determines whether the event/question is related to any of the event/answers already on the blackboard 202 (that is, whether the event/question is answered by an event/answer already on the blackboard 202). Event/answers may have been earlier posted on the blackboard 202 by operators via the user interface 250 or by the modules 214.

The information in events are sufficient for the facilitator 208 to match event/questions with corresponding event/answers. For example, an event/question and a corresponding event/answer may both be assigned an identical identification code.

If the event/question is related to one of the event/answers already on the blackboard 202, then the facilitator 208 takes control path 432. If the event/question is not related to any of the event/answers already on the blackboard 202, then the facilitator 208 takes control path 436.

If the facilitator 208 determines in step 422 that the event is an event/answer, then in step 442 the facilitator 208 performs two tasks. First, the facilitator 208 generates a cumulative answer (if possible) for an underlying question. Second, the facilitator 208 places the cumulative answer on the blackboard 202.

Consider an example shown in Example 1, below. Example 1 illustrates a base question Q0. Rules R1, R2, and R3 from knowledge base 238 provide distinct answers to Q0. Specifically, R1 provides answer A1, R2 provides answer A2, and R3 provides answer A3.

Suppose that A1 is posted on the blackboard 202 (that is, R1 is complete and has provided answer A1 to Q0). Suppose further that at step 442 the facilitator 208 is processing A2. To generate a cumulative average in step 442, the facilitator 208 combines A1 and A2 to produce CA, which represents a single answer to Q0. When A3 comes in (if R3 provides an answer to Q0), then the facilitator 208 in step 442 will combine the cumulative answer of A1 and A2 (that is, CA) with A3 to produce CA', a new cumulative answer to Q0. As noted above, the facilitator 208 will then post the cumulative answer CA' on the blackboard 202.

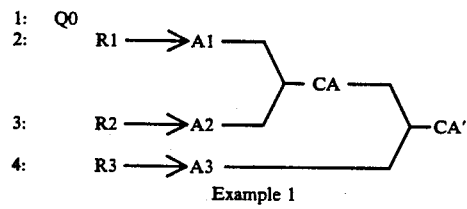

Example 1

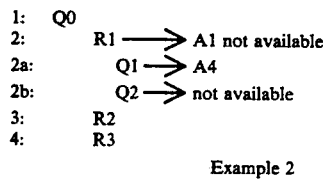

Example 2

In a preferred embodiment of the present invention, the facilitator 208 generates cumulative answers by calculating simple averages.

Note that the facilitator 208 produces cumulative answers only if an answer for the underlying question is available. Consider Example 2, above (which is related to Example 1). R1 contains two subquestions Q1 and Q2. Suppose that in step 442 the event/answer represents A4, which is an answer to Q1. Q2 does not have an answer. Since answers to both Q1 and Q2 are not available, an answer to Q0 based on R1 is not available. Since an answer (that is, A1) to the underlying question (that is, Q0) is unavailable, the facilitator 208 does not produce a cumulative answer to the underlying question Q0.

In step 446, the facilitator 208 determines whether the event/answer is complete. An event/answer is complete if the event/answer can be propagated to assist other modules 214 in performing their work. For example, suppose in the scenario described above that Q1 depended on measurements M1 and M2. Both M1 and M2 must complete to determine an answer for Q1. In step 446, suppose the facilitator 208 is processing a result of M1. A result of M2 is not available. In this scenario, the event/answer (that is, the result of M1) is not complete because the event/answer cannot help another module 214 (in this case, represented by R1) perform its work.

In step 446, if the event/answer is not complete, then the facilitator 208 takes control path 448 and the expert system 102 checks for further events. In the above scenario, Q1 waits for the result of M2 to become available. Once M1 and M2 are both available, Q1 produces an answer for R1. Such an event/answer is complete since it helps another module (that is, R1) perform its work (in this scenario, an answer to Q1 helps R1 produce an answer for Q0).

In step 446, if the event/answer is complete, then the facilitator 208 continues to process the event/answer by taking control path 450.

In step 452, the facilitator 208 determines whether the event/answer is related to any of the event/questions already on the blackboard 202. Event/questions may have been earlier posted on the blackboard 202 by operators via the user interface 250 or by the modules 214. In the scenario above, if the event/answer represents an answer to Q1, then the event/answer would be related to R1.

If the event/answer is related to one or more of the event/questions already on the blackboard 202, then the facilitator 208 takes control path 454. If the event/answer is not related to any of the event/questions already on the blackboard 202, then the facilitator 208 takes control path 458.

Figure 5:
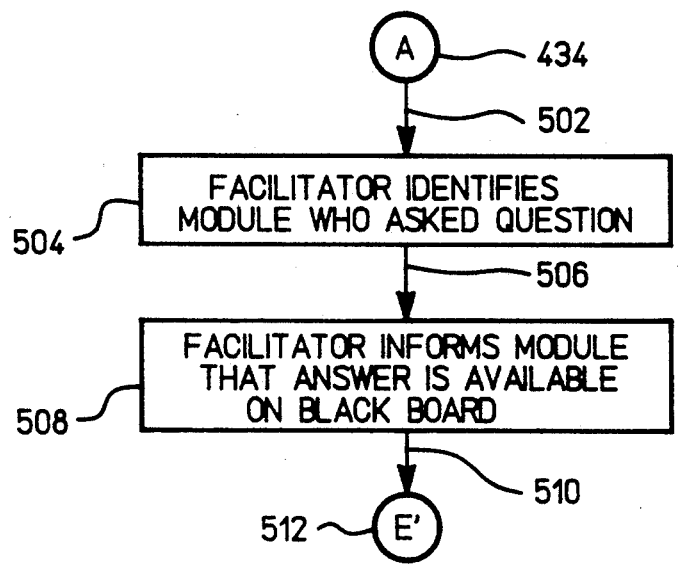
FIG. 5 illustrates a second operational flowchart of a preferred embodiment of the present invention.

Referring now to FIG. 5, if the facilitator 208 takes control path 432 because the event/question is related to one of the event/answers already on the blackboard 202, then in step 504 the facilitator 208 identifies the module 214 who asked the event/question. The facilitator 208 maintains sufficient information regarding the event/questions and modules 214 to identify the modules 214 who asked the event/questions.

In step 508, the facilitator 208 informs the identified module 214 that an event/answer related to its event/question is present in the blackboard 202. The facilitator 208 may pass the actual event/answer to the identified module 214. In a preferred embodiment of the present invention, the facilitator 208 passes a pointer to the event/answer in the blackboard 202.

The expert system 102 then performs step 512. Step 512 represents the manner in which the identified module 214 uses event/answers to answer underlying questions. Step 512 is described in a section below regarding the detailed operation of the modules 214.

Figure 6:
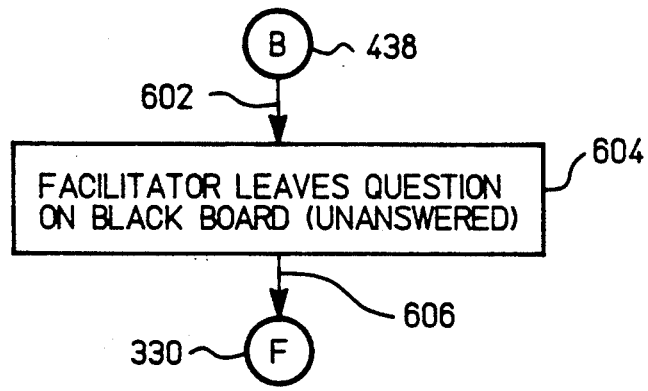
FIG. 6 illustrates a third operational flowchart of a preferred embodiment of the present invention.

Referring now to FIG. 6, if the facilitator 208 takes control path 436 because the event/question is not related to any of the event/answers already on the blackboard 202, then in step 604 the facilitator 208 leaves the event/question on the blackboard 202 unanswered. This illustrates one way in which unanswered questions are posted on the blackboard 202.

The expert system 102 then performs step 330, or equivalently, the expert system checks for further events arriving at the event log 106. Referring again to FIG. 4, if events have not arrived at the event log 106, then the expert system 102 executes step 466. Step 466 represents the manner in which the facilitator 208 processes unanswered questions on the blackboard 202. Step 466 is described at a later point in this section.

Figure 7:
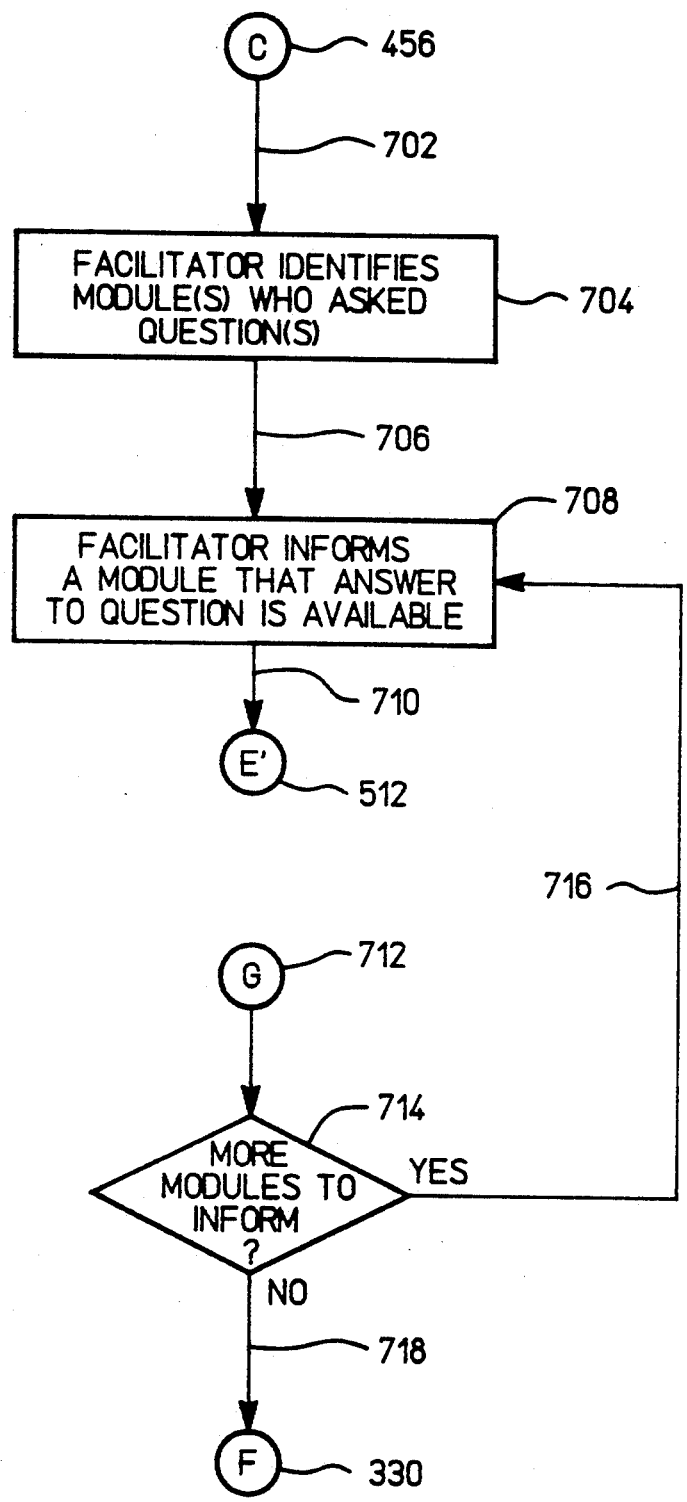
FIG. 7 illustrates a fourth operational flowchart of a preferred embodiment of the present invention.

Referring now to FIG. 7, if the facilitator 208 takes control path 454 because the event/answer is related to at least one of the event/questions already on the blackboard 202, then in step 704 the facilitator 208 identifies the modules 214 who asked the event/questions. The facilitator 208 maintains sufficient information regarding the event/questions, event/answers, and modules 214 to (1) identify the event/questions associated with the event/answer, and (2) identify the modules 214 who asked the event/questions.

In step 708, the facilitator 208 informs the first identified module 214 that an event/answer related to its event/question is present in the blackboard 202. The facilitator 208 may pass the actual event/answer to the identified module 214. In a preferred embodiment of the present invention, the facilitator 208 passes a pointer to the event/answer in the blackboard 202.

The expert system 102 then performs step 512. Step 512 represents the manner in which the identified module 214 uses event/answers to answer underlying questions. Step 512 is described in a section below regarding the detailed operation of the modules 214.

After executing step 512, the expert system 102 resumes at 712 and performs step 714. In step 714, the facilitator 208 determines if there are any further identified modules 214 to inform regarding the event/answer. The facilitator 208 performs the control loop formed by control line 716 until all identified modules 214 have been informed.

Once all identified modules 214 have been informed, the expert system 102 performs step 330, or equivalently, the expert system checks for further events arriving at the event log 106.

Figure 8:
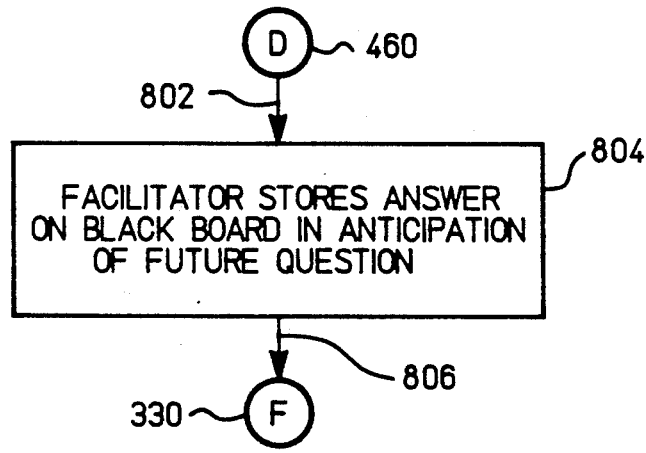
FIG. 8 illustrates a fifth operational flowchart of a preferred embodiment of the present invention.

Referring now to FIG. 8, if the facilitator 208 takes control path 458 because the event/answer is not related to any of the event/questions already on the blackboard 202, then in step 804 the facilitator 208 leaves the event/answer on the blackboard 202. This illustrates one way in which event/answers are posted on the blackboard 202 before event/questions are asked.

The expert system 102 then checks for further events arriving at the event log 106 (that is, the expert system 102 performs step 330).

Figure 9:
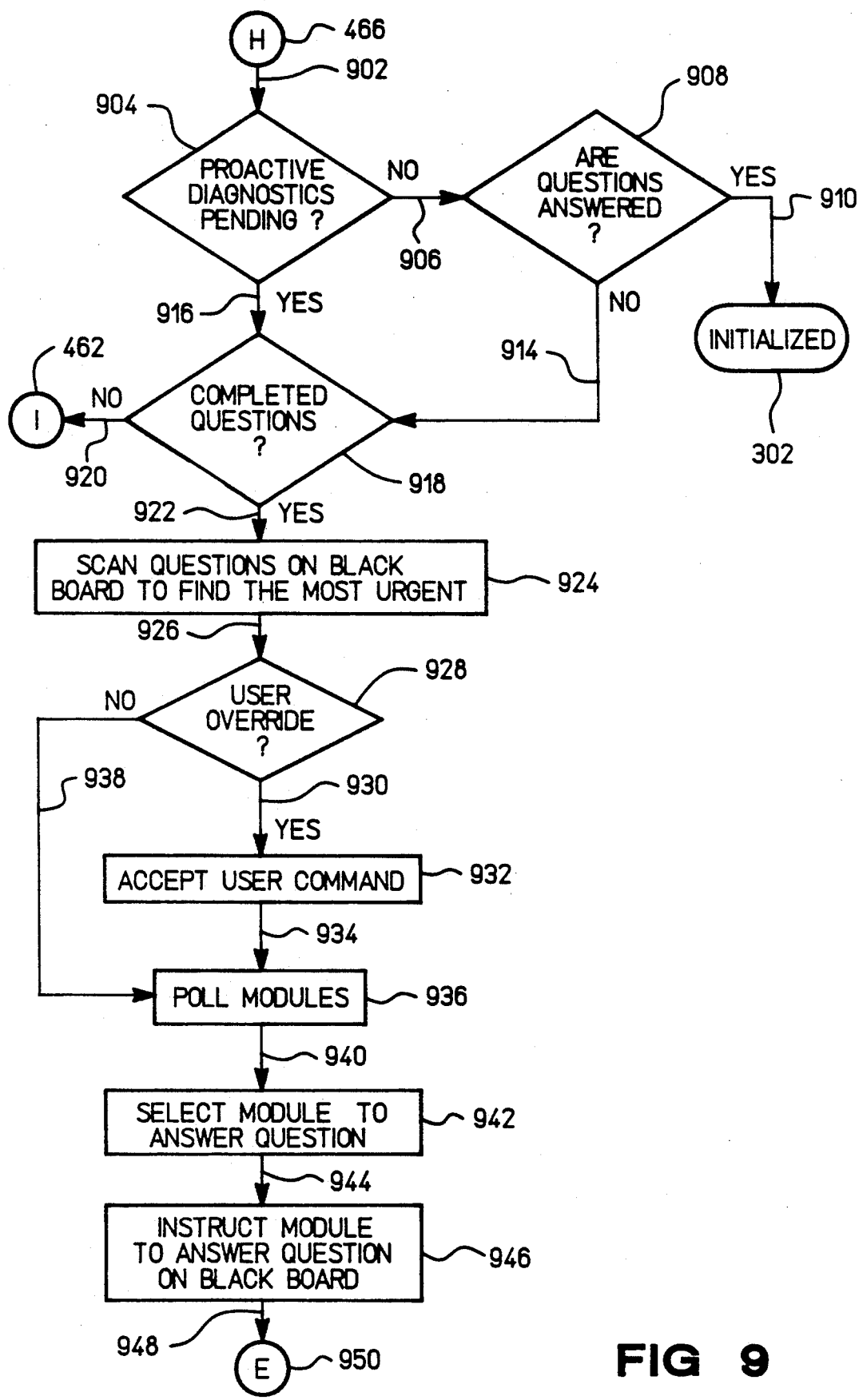
FIG. 9 illustrates an operational flowchart of a facilitator of the present invention.

The manner in which the facilitator 208 processes questions on the blackboard 202 is described below with reference to FIG. 9.

In step 904, the facilitator 208 determines whether proactive diagnosis is pending (see FIG. 3 and the related discussion above for a description of proactive diagnosis). Proactive diagnosis is pending if any of the forward rules related to proactive diagnosis are still pending on the blackboard 202. If all of the forward rules related to proactive diagnosis are complete, then proactive diagnosis is not pending.

If proactive diagnosis is not pending, then in step 908 the facilitator 208 determines if all of the event/questions on the blackboard 202 are complete. If all the event/questions on the blackboard 202 are complete, then in step 302 the facilitator 208 reinitializes the expert system 102. The facilitator 208 reinitializes the expert system 102 in order to restart the proactive diagnostic process.

If proactive diagnostics are pending in step 904, or if any questions on the blackboard 202 are incomplete, then the facilitator 208 does not reinitialize the expert system 102.

Instead, the facilitator 208 executes step 918. In step 918, the facilitator 208 determines whether the event/answer is complete. Step 918 is equivalent to step 446 in FIG. 4. Thus, if the event/answer is complete, then the facilitator 208 takes control path 464 and begins executing at step 452 in FIG. 4.

If the event/answer is not complete in step 918, then the facilitator 924 scans the event/questions on the blackboard 202 to identify the most urgent question. In a preferred embodiment of the present invention, the event/questions are prioritized according to frequency (how often a problem may occur on the network 142) and severity (the impact a problem may have on the network 142). A question related to a problem with high frequency and high severity is given a high priority. The facilitator 924 selects the identified question for processing.

The identified question may be either related to proactive diagnostics or reactive diagnostics. Thus, once posted on the blackboard 202, the facilitator 208 processes questions and rules related to proactive and reactive diagnostics in the same manner.

In step 928, the facilitator 208 determines whether a user override exists. If a user override exists, then in step 932 the facilitator 208 discards its selected question and accepts the operator's question for processing.

In an alternative embodiment of the present invention, the facilitator 208 does not explicitly determine whether a user override exists in step 932. Rather, operators enter questions via the user interface 250. The expert system 102 automatically affects the priority of the operator questions such that the facilitator 208 in step 924 determines that the operator questions are the most urgent. If the expert system 102 operates according to this alternative embodiment, then steps 928 and 932 are not performed.

Steps 928 and 932 illustrate one way in which the present invention provides for operator interaction and control over the expert system 102. Operators monitor the operation of the expert system 102 via the user interface. Specifically, the expert system 102 sends progress and status messages to the operator via the user interface. Such progress and status messages include the facilitator's 924 selection of a question for processing. An operator (particularly an expert operator) may choose to override the facilitator's 924 selection of a question for processing. Thus, steps 928 and 932 provide for operator interaction and control because operators can control the manner and timing in which the expert system 102 processes questions.

In step 936, after a question is selected for processing (either selected by the facilitator 208 or by an operator), the facilitator 208 polls the modules 214. In response to the facilitator's 208 poll, the modules 214 respond with estimates relating to their efficiency and effectiveness in answering the selected question. The facilitator 208 uses the information from the modules 214 to identify the module 214 that can most efficiently and effectively answer the identified question.

In step 946, the facilitator 208 instructs the selected module 214 to answer the identified question.

Following step 946, the expert system 102 performs step 950. Step 950 represents the manner in which the identified module 214 answers identified questions. Steps 950 and 512 (the manner in which the identified module 214 uses event/answers to answer underlying questions) are described in the following section.

3.3.3. Modules

The operation of the modules 214 are described in detail in this section.

3.3.3.1. Generic Module

The operation of the generic module 214A is described in this section with reference to FIG. 10. The operation of the specific modules 214B, 214C, 214E is similar to the operation of the generic module 214A. Any variations in the operation of these modules are the result of the specific responsibilities of the modules 214.

Figure 10A:
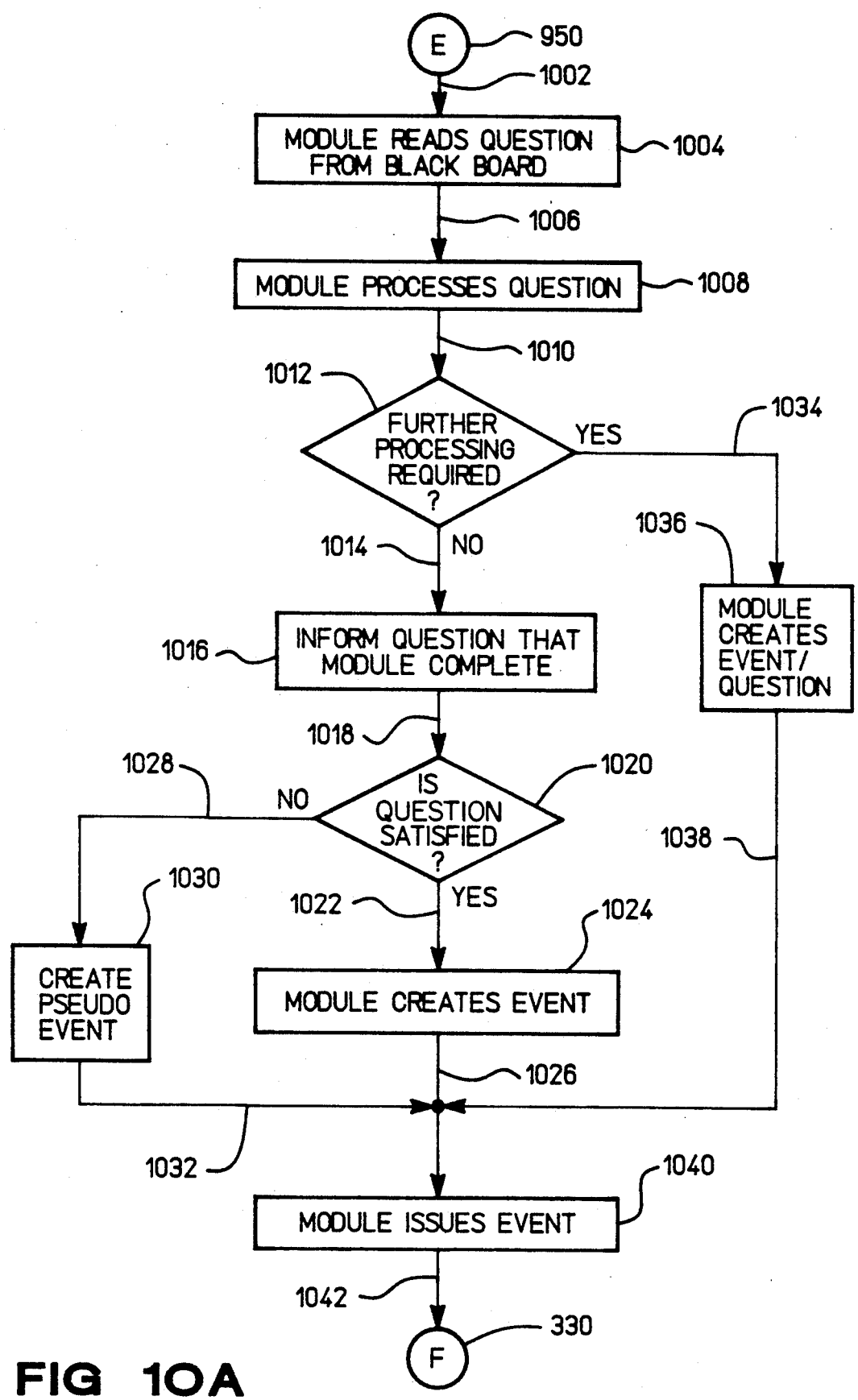
FIGS. 10A and 10B illustrate operational flowcharts of a generic module of the present invention.

FIG. 10A illustrates the operation of the generic module 214A while the generic module 214A is answering identified questions (that is, the questions selected by the facilitator 208 for processing in step 924).

After the generic module 214A is selected to answer the question by the facilitator 208 (in steps 942 and 946), the generic module 214A performs step 1004.

In step 1004, the generic module 214A reads the event/question from the blackboard 202.

In step 1008, the generic module 214A processes the event/question in order to determine an answer for the event/question. The details of such processing depends on the functionality of the specific module 214. The detailed operation of specific modules 214B, 214C, and 214E are described in the following sections.

In step 1012, the generic module 214A determines if further processing is required to answer the event/question. For example, additional information may be required to answer the event/question.

If such further processing is required, then in step 1036 the generic module 214A creates an event/question in order to determine the required information.

Consider the following example involving the rule module 214B. Suppose Q0 represents an underlying question, and rules R1 and R2 from the knowledge base 238 pertain to Q0 (that is, R1 and R2 provide answers for Q0). Suppose R1 depends on questions Q1 and Q2. If the rule module 214B determines an answer to Q1 in step 1008, and an answer to Q2 is still pending, then in step 1012 the rule module 214B would determine that further processing (regarding Q2) to answer R1 would be required.

If such further processing is not required, then in step 1016 the generic module 214A notifies the underlying question that the generic module 214A is complete. Such notification may be represented by setting a flag in the data structure variable that represents the underlying question. In the above example involving the rule module 214B, suppose the answer to Q2 is determined in step 1008, and the answer to Q1 is already available. Further processing would not be required to determine an answer for R1. Thus, in step 1016, the rule module 214B would notify Q0 that processing for R1 is complete.

In step 1020, the generic module 214A determines if the question is satisfied (that is, if the question is answered). For example, in the above example involving the rule module 214B, R1 depends on Q1 and Q2. R1 is satisfied only if both Q1 and Q2 are satisfied. Otherwise, R1 is not satisfied. For example, R1 may be: "R1 is satisfied if (Q1) element A cannot communicate with element B on the network 142 and (Q2) collisions are high." R1 is satisfied only if elements A and B cannot communicate and the collisions are high.

In step 1024, if the question is satisfied in step 1020, then the generic module 214A creates an event which conveys the satisfaction of the question. The specific contents of the event depends on the functionality of the specific module 214. For example, the rule module 214B operates as follows. For forward rules, the rule module 214B creates an event/question. This is equivalent to a hypothesis of a network problem. For backward rules, the rule module 214B creates an event/answer. This is an answer to a question and is used to confirm hypotheses.

In step 1030, if the question is not satisfied in step 1020, then the generic module 214A creates a pseudo event. The pseudo event causes control to pass to step 466 once step 1040 is complete. The pseudo event is required to insure that the facilitator 208 receives control via an event being passed to it.

In step 1040, the generic module 214A issues the event generated in either step 1024, 1030, or 1036.

In step 330, the expert system 102 checks for further events arriving at the event log 106.

Figure 10B:
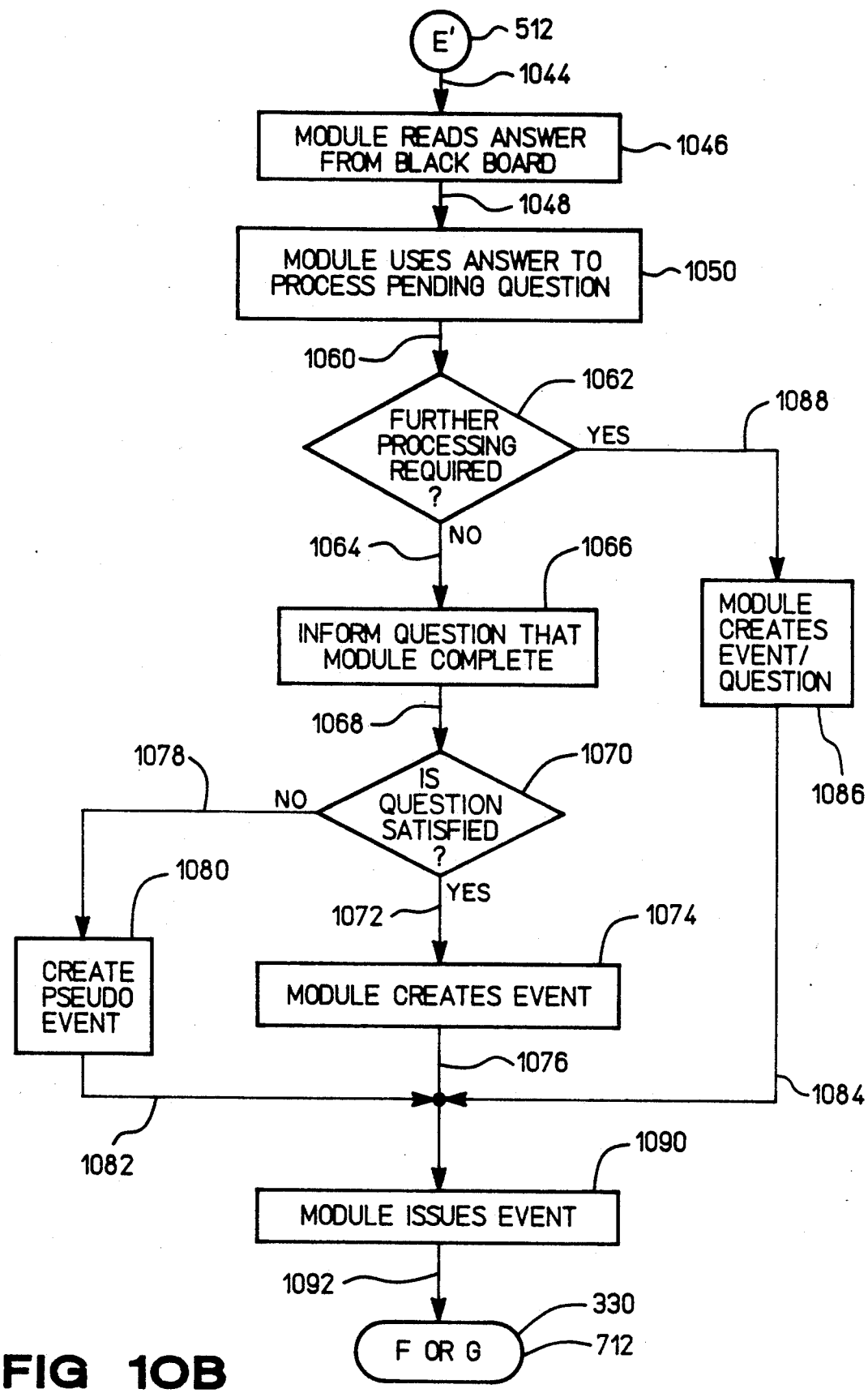

FIG. 10B illustrates the operation of the generic module 214A while the generic module 214A is using event/answers to answer underlying questions. The operation of the generic module 214A during the processes illustrated in FIGS. 10A and 10B are similar.

In step 1046, the generic module 214A reads the event/answer from the blackboard 202.

In step 1050, the generic module 214A uses the event/answer to answer the underlying event/question. The details of such processing depends on the functionality of the specific module 214. The detailed operation of specific modules 214B, 214C, and 214E are described in the following sections.

In step 1062, the generic module 214A determines if further processing is required to answer the underlying event/question. For example, additional information may be required to answer the event/question.

If such further processing is required, then in step 1086 the generic module 214A creates an event/question in order to determine the required information.

However, if such further processing is not required, then in step 1066 the generic module 214A notifies the underlying question that the generic module 214A is complete. Such notification may be represented by setting a flag in the data structure variable that represents the underlying question.

In step 1070, the generic module 214A determines if the question is satisfied (that is, if the question is answered).

In step 1074, if the question is answered in step 1070, then the generic module 214A creates an event which conveys the satisfaction of the question. The specific contents of the event depends on the specific functionality of the module 214.

In step 1080, if the question is not satisfied in step 1070, then the generic module 214A creates a pseudo event. The pseudo event causes control to pass to step 466 once step 1090 is complete. The pseudo event is required to insure that the facilitator 208 receives control via an event being passed to it.

In step 1090, the generic module 214A issues the event generated in either step 1074, 1080, or 1086.

In step 330, the expert system 102 transfers control to either step 330 or 712. The expert system 102 transfers control to step 712 if the processing shown in FIG. 10B was performed pursuant to an event/answer where a related question was available (see control line 454 in FIG. 4). Otherwise, the expert system 102 transfers control to step 330 in order to check for further events arriving at the event log 106.

The detailed operation of specific modules 214B, 214C, 214E are described in the following sections.

3.3.3.2. Measurement Module

Figure 11:
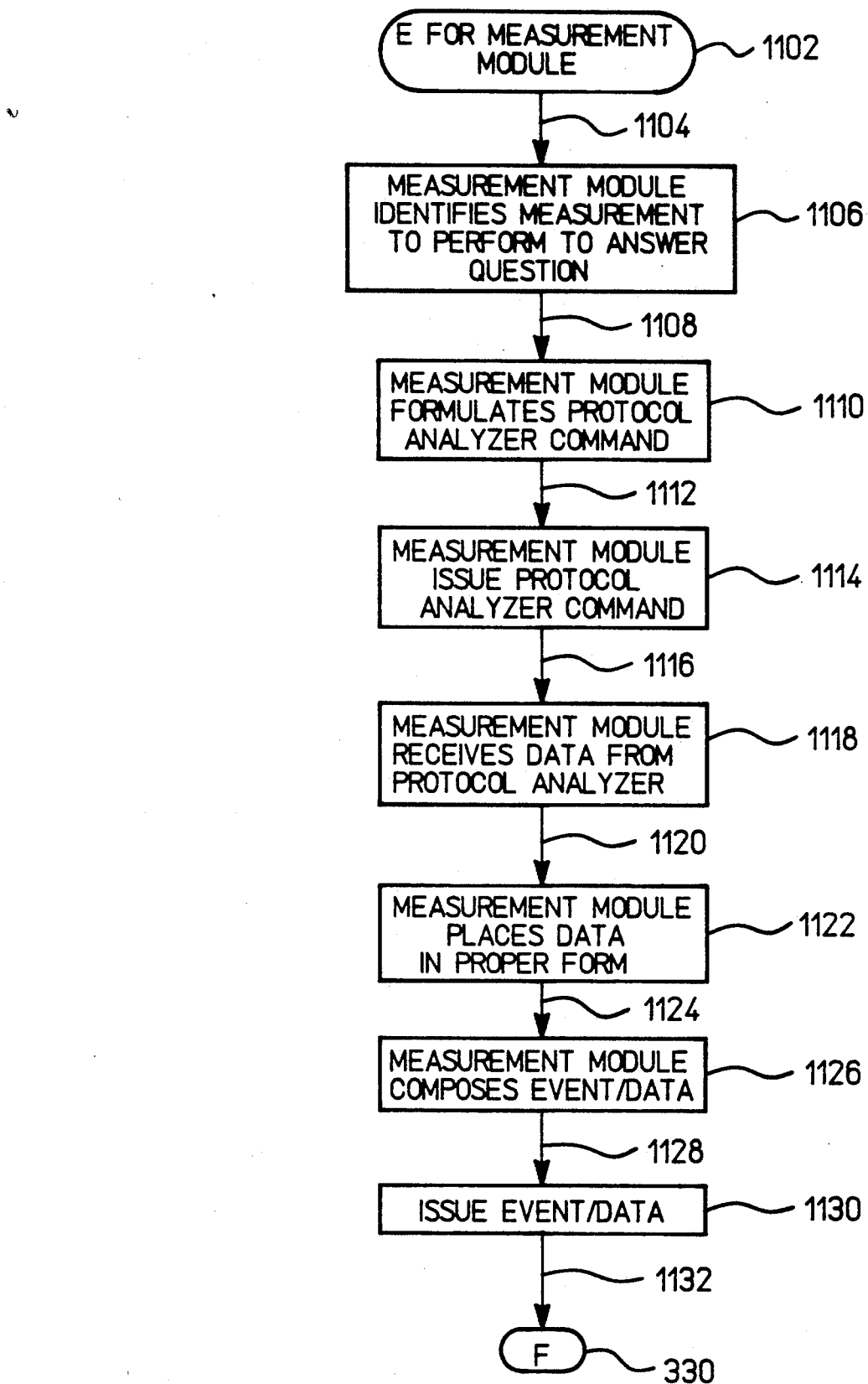
FIG. 11 illustrates an operational flowchart of a measurement module of the present invention.

The operation of the measurement module 214C is illustrated in FIG. 11. The measurement module 214C represents the interface between the expert system 102 of the present invention and the protocol analyzer 138.

In a first embodiment of the present invention, the measurement module 214C interacts with the protocol analyzer 138 via the protocol analyzer interface 120. The protocol analyzer interface 120 represents a board which plugs into one of the expansion slots of the computer platform's 104 interface bus (not explicitly shown in FIG. 1).

In a second embodiment of the present invention, the functions performed by the protocol analyzer interface 120 and the protocol analyzer 138 are located on a single protocol analyzer card (not shown in FIG. 1). The protocol analyzer card represents a board which plugs into one of the expansion slots of the computer platform's 104 interface bus (not explicitly shown in FIG. 1).

According to the first embodiment of the present invention, to send and receive data and commands to and from the protocol analyzer 138, the measurement module 214C sends instructions to the protocol analyzer interface 120. In response to the instructions, and pursuant to software commands 122 contained within the protocol analyzer interface 120, the protocol analyzer interface 120 performs the measurements specified by the measurement module's 214C instructions.

Protocol analyzers 138 having the following capabilities are suitable for use with the expert system 102 of the present invention. First, the protocol analyzers 138 must have sufficient measurement capability, functionality, and versatility to thoroughly test the data communication networks 142. Protocol analyzers 138 meeting this requirement are currently available, and include the Sniffer Protocol Analyzer by Network General, the Lanalyzer by Excelan, and the Hewlett Packard 4972 protocol analyzer.

Second, the protocol analyzers 138 must be completely programmable. That is, all protocol analyzer functions and features must be controllable by the expert system 102 (or any computer program which is interfacing with the protocol analyzers 138) without human intervention.

Third, the protocol analyzers 138 must return all results to the expert system 102 (or any computer program which is interfacing with the protocol analyzers 138) without human intervention.

Referring now to FIG. 11, in step 1106 the measurement module 214C identifies a measurement which corresponds to the event/question. In a preferred embodiment of the present invention, there is a one-to-one correspondence between the event/questions that can be best answered by the measurement module 214C and the protocol analyzer measurements.

In step 1110, the measurement module 214C formulates a protocol analyzer command to instruct the protocol analyzer 138 to perform the identified measurement. In a preferred embodiment of the present invention (as shown in FIG. 1), the formulated protocol analyzer command does not directly instruct the protocol analyzer 138. Instead, the formulated protocol analyzer command is sent to the protocol analyzer interface 120, which in turn sends a command to the protocol analyzer 138 which causes the protocol analyzer 138 to perform the identified command. In an alternate embodiment, the formulated protocol analyzer command directly instructs the protocol analyzer 138 to perform the identified command.

In step 1114, the measurement module 214C sends the formulated protocol analyzer command to the protocol analyzer 138.

In step 1118, the measurement module 214C receives a response to the identified measurement from the protocol analyzer 138 by way of the protocol analyzer interface 120.

In step 1122, the measurement module 214C formats the response such that the response is in a condition for transmission through the expert system 102. Such formatting may include placing the response in an envelope according to a standard protocol within the expert system 102.

In steps 1126 and 1130, the measurement module 214C composes and issues an event/answer which contains the response from the protocol analyzer 138.

3.3.3.3. User Questions Module

Figure 12:
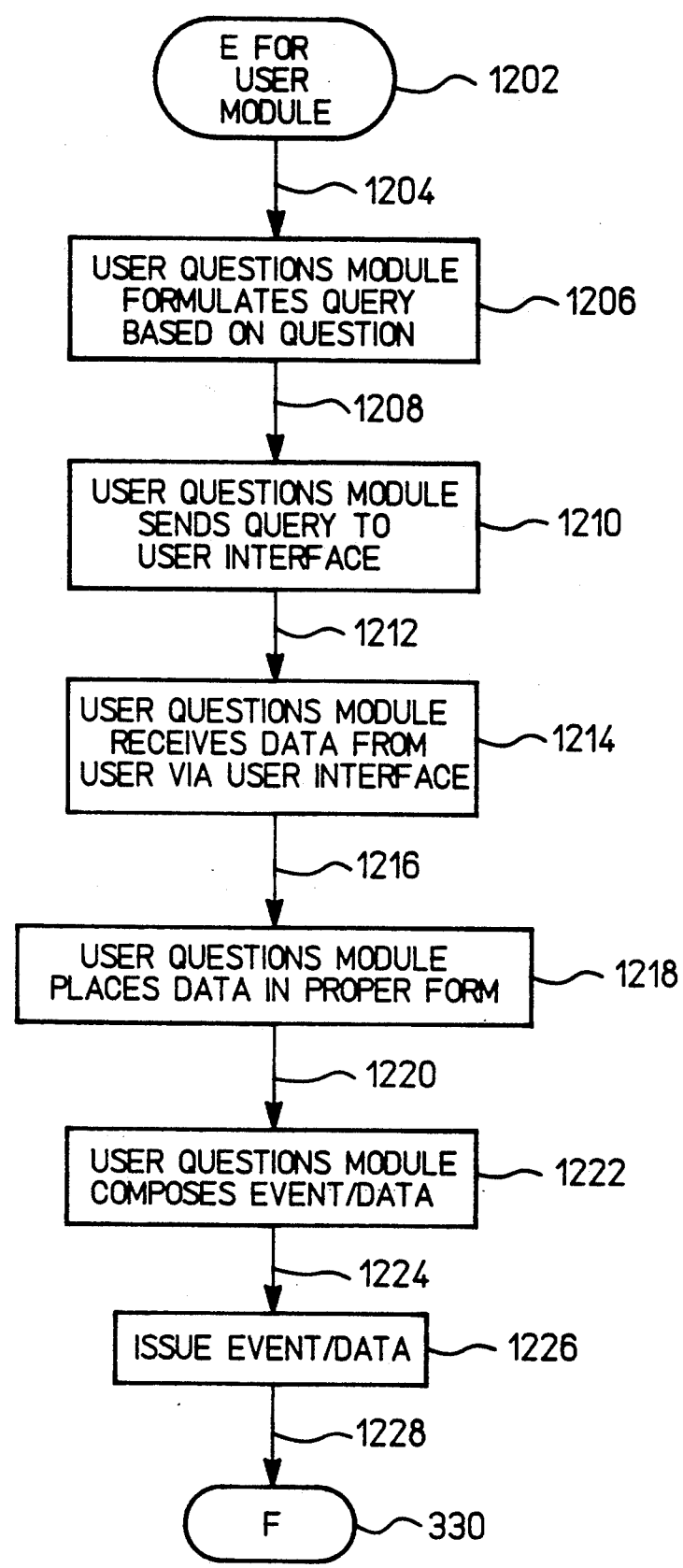
FIG. 12 illustrates an operational flowchart of a user questions module of the present invention.

The operation of the user questions module 214E is illustrated in FIG. 12. The user questions module 214E represents the interface between human operators and the expert system 102 with regard to obtaining information for the expert system 102 to use in diagnosing the network 142.

In step 1206, the user questions module 214E identifies a user question which corresponds to the event/question. The user question may ask the user to perform a measurement with a device other than the protocol analyzer 138. In a preferred embodiment of the present invention, there is a one-to-one correspondence between the event/questions that can be best answered by the user questions module 214E and the user questions.

In step 1210, the user questions module 214E sends the user question to the user interface 250.

In step 1214, the user questions module 214E receives a response to the user question from the user via the user interface 250.

In step 1218, the user questions module 214E formats the response such that the response is in a condition for transmission through the expert system 102. Such formatting may include placing the response in an envelope according to a standard protocol within the expert system 102.

In steps 1222 and 1226, the user questions module 214E composes and issues an event/answer which contains the response from the user.

3.3.3.4. Rule Module

Figure 13:
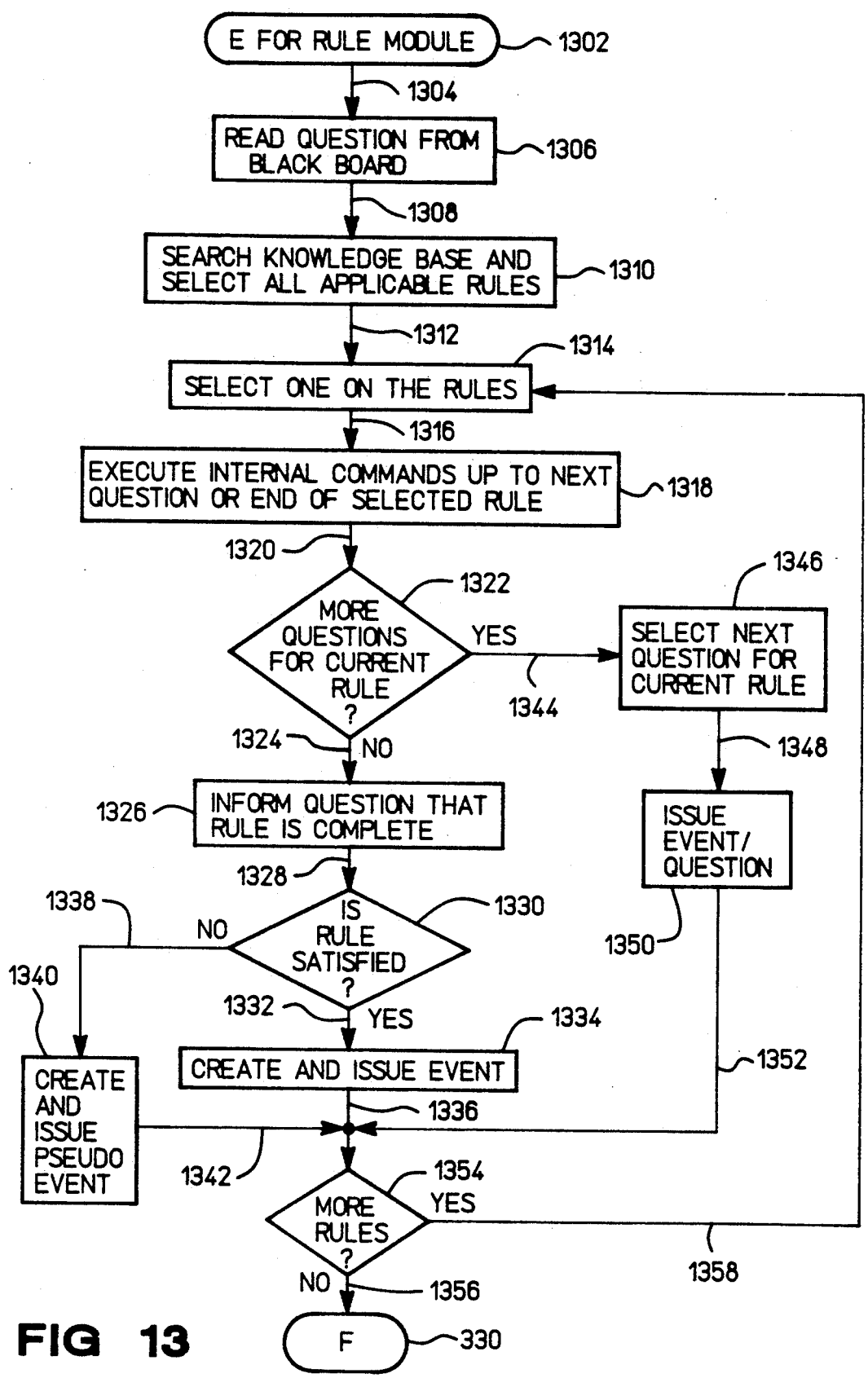
FIG. 13 illustrates a first operational flowchart of a rule module of the present invention.
Figure 14:
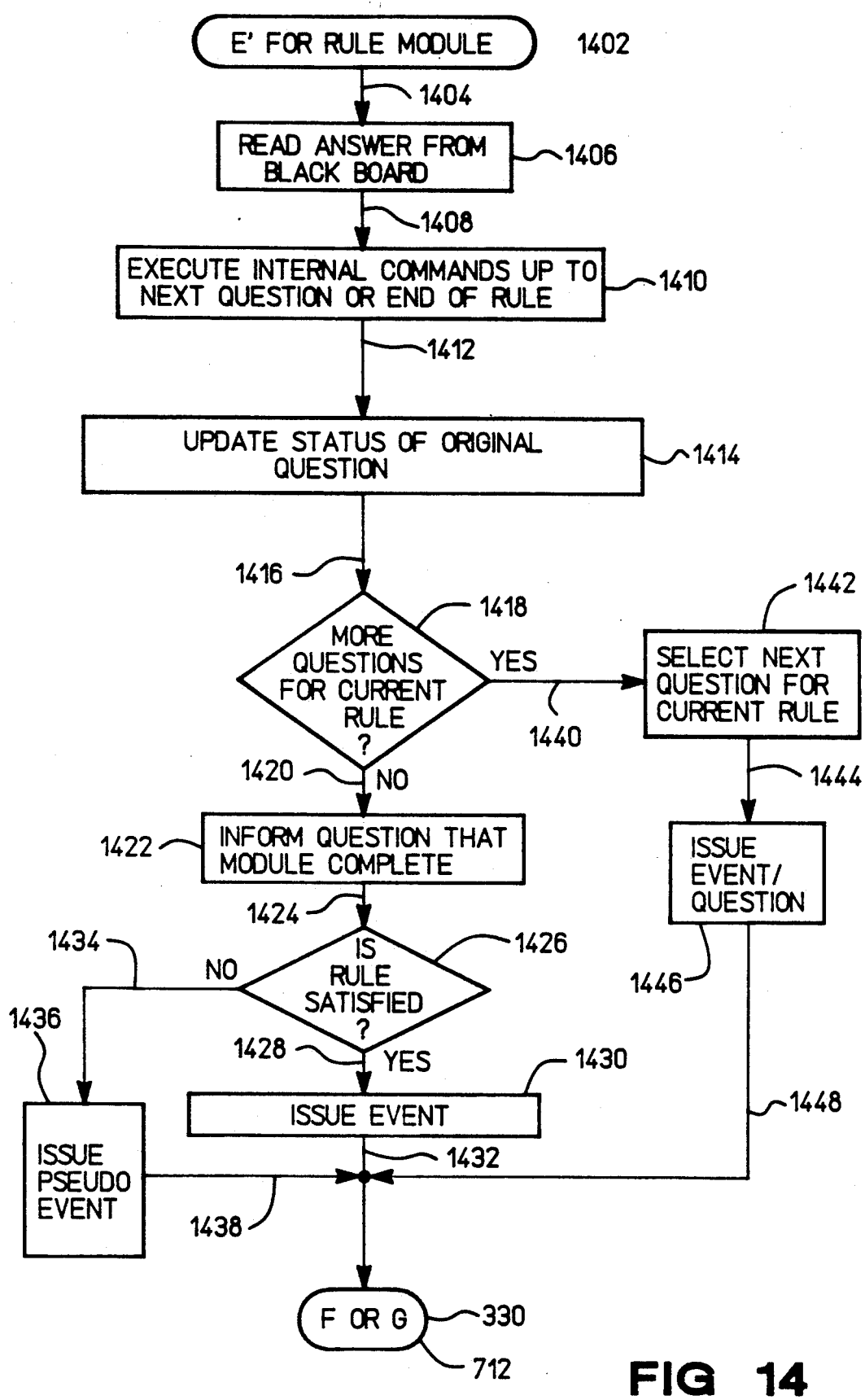
FIG. 14 illustrates a second operational flowchart of a rule module of the present invention.

The operation of the rule module 214B is illustrated in FIGS. 13 and 14.

FIG. 13 illustrates the operation of the rule module 214B while the rule module 214B is answering identified questions (that is, the questions selected by the facilitator 208 for processing in step 924). Recall that the identified question is stored in an event/question.

In step 1306, the rule module 214B reads the event/question from the blackboard 202.

In step 1310, the rule module 214B searches through the knowledge base 238 to identify all the rules which apply to the event/question (that is, all the rules which supply an answer to the event question).

In step 1314, the rule module 214B selects one of the identified rules to process. In a preferred embodiment of the present invention, the rule module 214B selects the most efficient rule to process. The most efficient rule to process is determined by a cost factor (the cost on the expert system 102 to process the rule) and a confidence factor (the reliability of the rule to identify network problems). Efficient rules have low cost factors and high efficiencies. As shown in FIG. 22, the values for cost and confidence are associated with the rules.

In step 1318, the rule module 214B executes all internal commands up to the next question of the identified rule, or to the end of the rule. An internal command is a question or inquiry which the rule module 214B can answer immediately by referring to the databases 210, 236. For example, suppose a base question Q0 is associated with rules R1, R2, and R3. Suppose in step 1314 the rule module 214B selects rule R1 to process, and suppose R1 has internal commands C1 and C2, followed by question Q1, then internal command C3, and then questions Q2 and Q3. The next question of rule R1 is Q1 (since the rule module 214B processes rules from the beginning of the rules, and C1 represents the beginning of rule R1). Thus, the rule module 214B in step 1318 executes C1 and C2 since C1 and C2 occur before the next question Q1.

In step 1322, the rule module 214B determines if the current rule contains questions that have not yet been processed. For example, in the scenario above, the current rule R1 contains questions Q1, Q2, and Q3 which have not been processed.

If the current rule contains questions that have not yet been processed, then in step 1346 the rule module 214B selects the next question that has not been processed. In the scenario above for rule R1, the rule module 214B selects question Q1.

In step 1350, the rule module 214B creates and issues an event/question according to the question selected in step 1346.

If the questions associated with the current rule have all been processed, then in step 1326 the rule module 214B notifies the underlying question that the rule is complete. Such notification may be represented by setting a flag in the data structure variable that represents the underlying question. Step 1326 is analogous to step 1016.

In step 1330, the rule module 214B determines if the current rule is satisfied. Step 1330 is analogous to step 1020.

In step 1334, if the rule is satisfied in step 1330, then the rule module 214B creates and issues an event based on the particular rule. Step 1334 is analogous to steps 1024 and 1040.

In step 1340, if the rule is not satisfied in step 1330, then the rule module 214B creates and issues a pseudo event. Step 1340 is analogous to steps 1030 and 1040.

In step 1354, the rule module 214B determines whether the event/question contains any uninitiated rules. A rule is uninitiated if none of its associated questions are either complete or pending on the blackboard 202. If uninitiated rules exist, then the rule module 214B initiates the uninitiated rules via step 1354 and control loop 1358. That is, the rule module 214B performs the loop completed by control loop 1358 until all the rules associated with the event/question have been initiated.

In step 330, following the initiation of all the rules associated with the event/question, the expert system 102 checks for further events arriving at the event log 106.

FIG. 14 illustrates the operation of the rule module 214B while the rule module 214B is using event/answers to answer underlying questions.

In step 1406, the rule module 214B reads the event/answer from the blackboard 202.

In step 1408, the rule module 214B executes all internal commands up to the next unprocessed question of the rule associated with the event/answer, or to the end of the rule. For example, suppose a base question Q0 is associated with rules R1, R2, and R3. Suppose R1 has internal commands C1 and C2, followed by question Q1, then internal command C3, and then questions Q2 and Q3. Suppose the event/answer relates to R1, and specifically, the event/answer is the answer for Q1. Then in step 1408, the rule module 214B executes C3, since C3 is the only internal command which occurs before the next unprocessed question Q2 of the rule R1.

In step 1414, the rule module 214B updates the status of the underlying question. In the above scenario, suppose C1, C2, Q1, and Q2 are complete and the rule module 214B is processing the answer to Q3. If this is the case, then processing for R1 is complete. Thus, in step 1414, the rule module 214B notifies the base question Q0 that R1 is complete. Step 1414 is analogous to step 1066.

In step 1426, the rule module 214B determines if the current rule is satisfied. Step 1426 is analogous to step 1070.

In step 1430, if the rule is satisfied in step 1426, then the rule module 214B creates and issues an event based on the particular rule. Step 1430 is analogous to steps 1074 and 1090.

In step 1436, if the rule is not satisfied in step 1426, then the rule module 214B creates and issues a pseudo event. Step 1436 is analogous to steps 1080 and 1090.

In step 330, the expert system 102 transfers control to either step 330 or 712. The expert system 102 transfers control to step 712 if the processing shown in FIG. 10B was performed pursuant to an event/answer where a related question was available (see control line 454 in FIG. 4). Otherwise, the expert system 102 transfers control to step 330 in order to check for further events arriving at the event log 106.

3.3.4. User Interface

The operation of the user interface 250 is described in this section with reference to FIGS. 15, 16, 17, 18, 19, and 20.

The user interface 250 represents the interface between the expert system 102 and human operators. Operators can interface and control the operation of the expert system 102 through the user interface 250.

As shown in FIGS. 16, 17, 18, and 19, the user interface 250 according to a preferred embodiment of the present invention is composed of menus and windows. Operators navigate through the menus and windows using a keyboard and/or a pointing device (such as a mouse) attached to the terminal 126.

Figure 15:
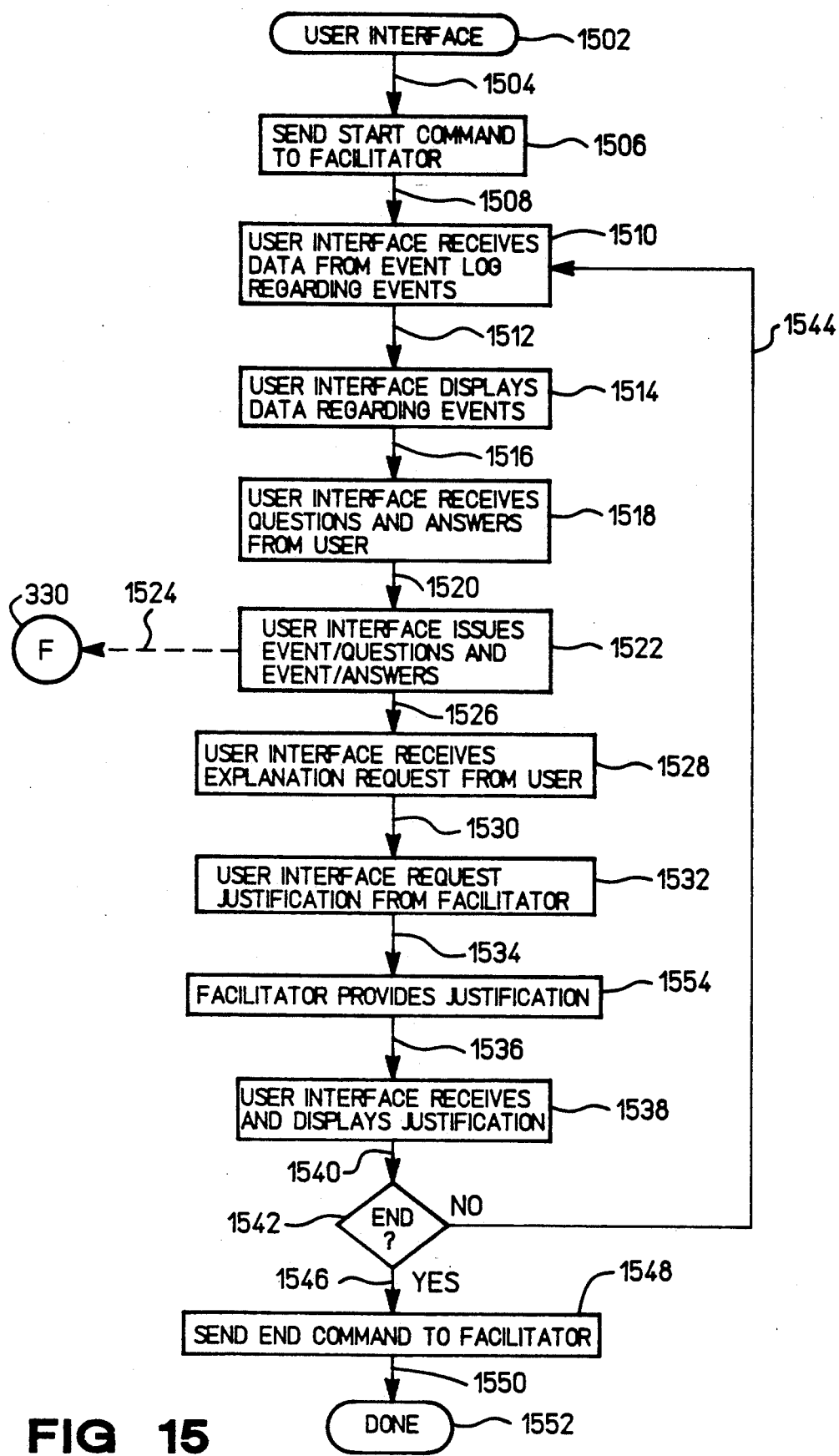
FIG. 15 illustrates an operational flowchart of a user interface module of the present invention.

FIG. 15 illustrates a typical flowchart of the operation of the user interface 250. Since the user interface 250 operates according to commands from operators, and these operator commands can come in any sequence and at any time, the flowchart shown in FIG. 15 is presented to provide an example of the manner in which the user interface 250 operates.

In step 1506, the operator sends a 'start' command from the user interface 250 to the facilitator 208 on line 256. In response to the start command, the facilitator 208 initializes the expert system 102 (see FIG. 3 and the associated discussion, above).

In step 1510, the user interface 250 receives data from the event log 106 regarding the events/questions and event/answers received by the event log 106. In step 1514, the user interface 250 displays the data to the operator via the terminal 126 in FIG. 1. The data represents progress and status information regarding the diagnoses of the network 142. This is one way the expert system 102 provides user interaction and control with the diagnosis process.

In step 1518, the user interface 250 receives questions and answers from operators. The questions may reflect problems, such as "Is my terminal connected to the network?". The answers may reflect operator observations and measurements, such as "The electrical continuity of cable XYZ is nominal." The questions and answers from operators may be either in response to queries from the user questions module 214E, or the user may enter a question or answer that is unsolicited. This is another way the expert system 102 provides user interaction and control with the diagnosis process.

In step 1522, the user interface 250 creates and issues events to the event log 106 based on the questions and answers provided by the operators. The expert system checks for these events at step 330 in FIG. 4.

In step 1528, the user interface 250 receives explanation requests from operators. The explanation requests include requests for an explanation regarding the facilitator's 208 reasoning (that is, the relationship of network problems 2302 to landmarks 2402 to data 2304), selection of questions to be processed, and a module's 214 creation and issue of event/questions. The explanation requests also include requests for information regarding the nature and significance of network problems, possible solutions to network problems, symptoms, and user questions.

In the preferred embodiment of the present invention, the operators send explanation requests to the user interface 250 by clicking (with the mouse) over text in the events window 1622 and the faults found window 1624.

In step 1532, the user interface 250 instructs the facilitator 208 to respond to the explanation requests.

In step 1554, the facilitator 208 responds to the explanation requests.

The facilitator 208 may instruct one of the modules 214 to respond to the explanation requests. When responding to the explanation requests, the facilitator 208 and modules 214 refer to data descriptors stored in the database 210. Examples of the data descriptors are shown in FIG. 21.

FIGS. 21A and 21B illustrate data descriptors related to network problems. In FIG. 21A, the problem is a noisy cable, as indicated by the name field. The definition field provides a definition of the problem. This field is accessed when the operator requests an explanation of the problem. The solution field provides a method to solve the problem. This field is accessed when the operator requests possible solutions to the problem.

FIG. 21C illustrates a data descriptor related to measurements. FIG. 21D illustrates a data descriptor related to landmarks, and FIGS. 21E, 21F, and 21G illustrate data descriptors related to symptoms. Symptoms are related to questions that are asked of users via the user questions module 214E. The fields of these data descriptors are analogous to those of the data descriptors related to problems shown in FIG. 21A.

In step 1538, the user interface 250 receives the facilitator's 208 response and displays the response for the operator in explanation windows (not shown in FIGS. 16, 17, 18, 19) on the terminal 126. The explanation windows are windows which appear on the terminal 126 and which contain the facilitator's 208 responses to the operators' explanation requests.

In step 1542, the user interface 250 determines if the operator has entered an end command. If the operator has not entered an end command, the user interface 250 loops back to step 1510.

In step 1548, if the operator has entered an end command, then the user interface 250 sends an end command to the facilitator 208 on line 256. Upon receiving the end command, the facilitator 208 ends the operation of the expert system 102, and the diagnostic session of the expert system 102 is complete.

As noted above, according to a preferred embodiment of the present invention, the user interface 250 is composed of menus and windows. These menus and windows are illustrated in FIGS. 16, 17, 18, and 19.

Figure 16:
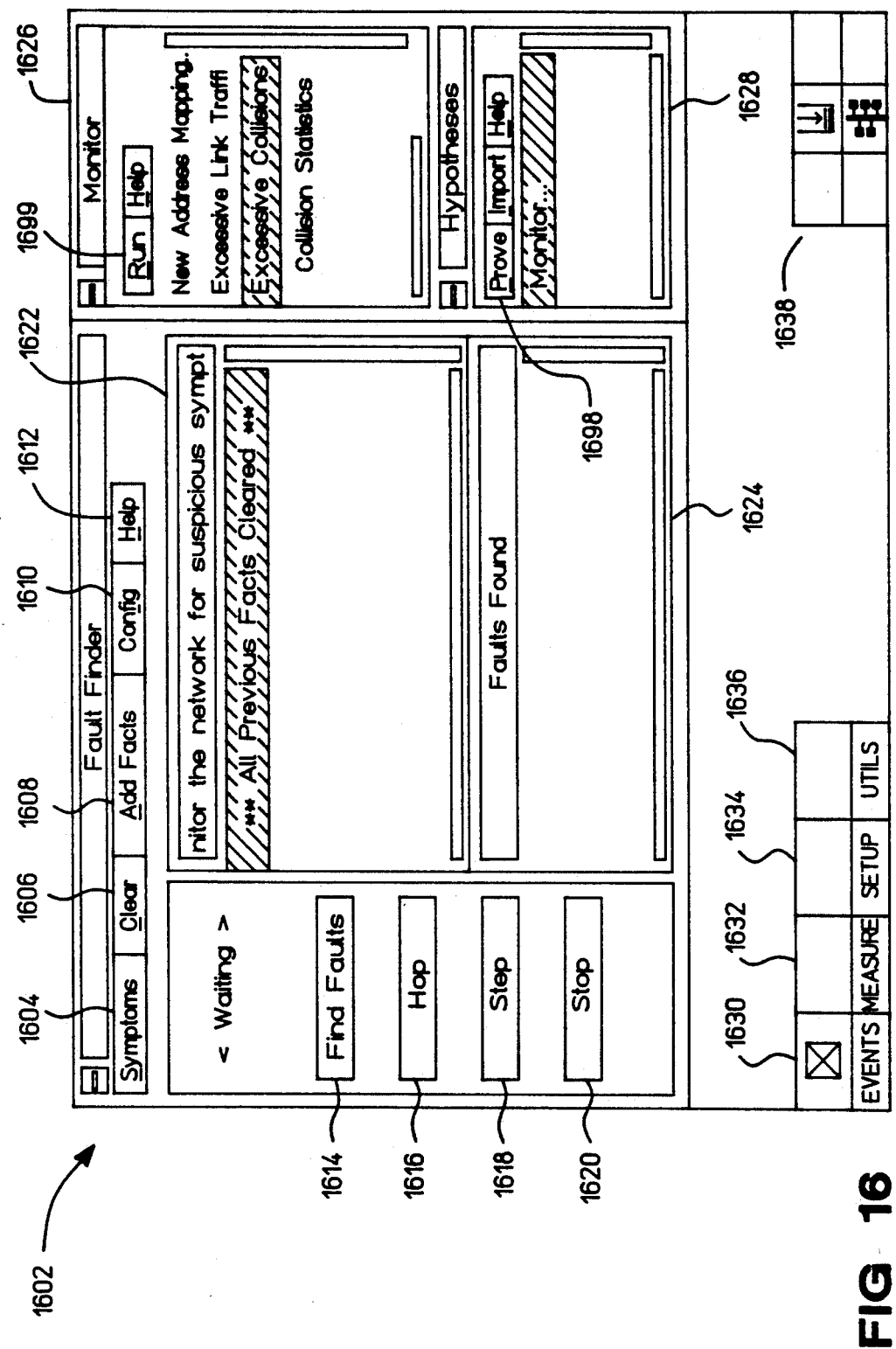
FIG. 16 illustrates a first terminal display image of a user interface module of the present invention.

FIG. 16 illustrates a display screen image 1602 of the terminal 126 when the expert system 102 is diagnosing data communication networks 142. The image 1602 has an events window 1622, a faults window 1624, a monitor window 1626, and a hypotheses window 1628. The image 1602 also has a number of pull-down menu buttons 1604, 1606, 1608, 1610, 1612. The image 1602 further has a number of command buttons 1614, 1616, 1618, 1620. The image 1602 has icons 1630, 1632, 1634, 1636 and a status area 1638.

As noted above, all events which are sent to the event log 106 are also sent to the user interface 250 for display to operators. These events are displayed in the events window 1622.

Confirmed network problems are displayed in the faults window 1624.

Questions from forward rules that are posted on the blackboard 202 are displayed in the monitor window 1626. Such questions represent landmarks. As noted above, the forward rules are used to hypothesize network problems.

The hypothesized network problems that are posted on the blackboard 202 are displayed in the hypotheses window 1628. Backward rules are used to confirm and reject the hypothesized network problems.

The monitor window 1626 shows the status of the monitor process (that is, the process of detecting primary landmarks). The hypotheses window 1628 shows the current set of hypotheses that are being processed. Operators may select the landmarks and hypotheses shown in the monitor window 1626 and hypotheses window 1628, respectively. In response to the operators' selection, the expert system 102 modifies the priority of the selected landmarks and hypotheses such that the selected landmarks and hypotheses are executed first. Thus, the facilitator 208 processes scenarios in an operator-defined order. This is another way in which the expert system 102 provides for operator interaction and control.

Operators use the pull-down menu buttons 1604, 1606, 1608, 1610, 1612 in order to control the expert system 102 and to configure the image 1602. Operators use the symptoms button 1604 to send complaints to the expert system 102. The manner in which the symptoms button 1604 is used is similar to the manner in which the add facts button 1608 is used (described below).

Operators use the clear button 1606 to reinitialize the expert system 102.

Figure 18:
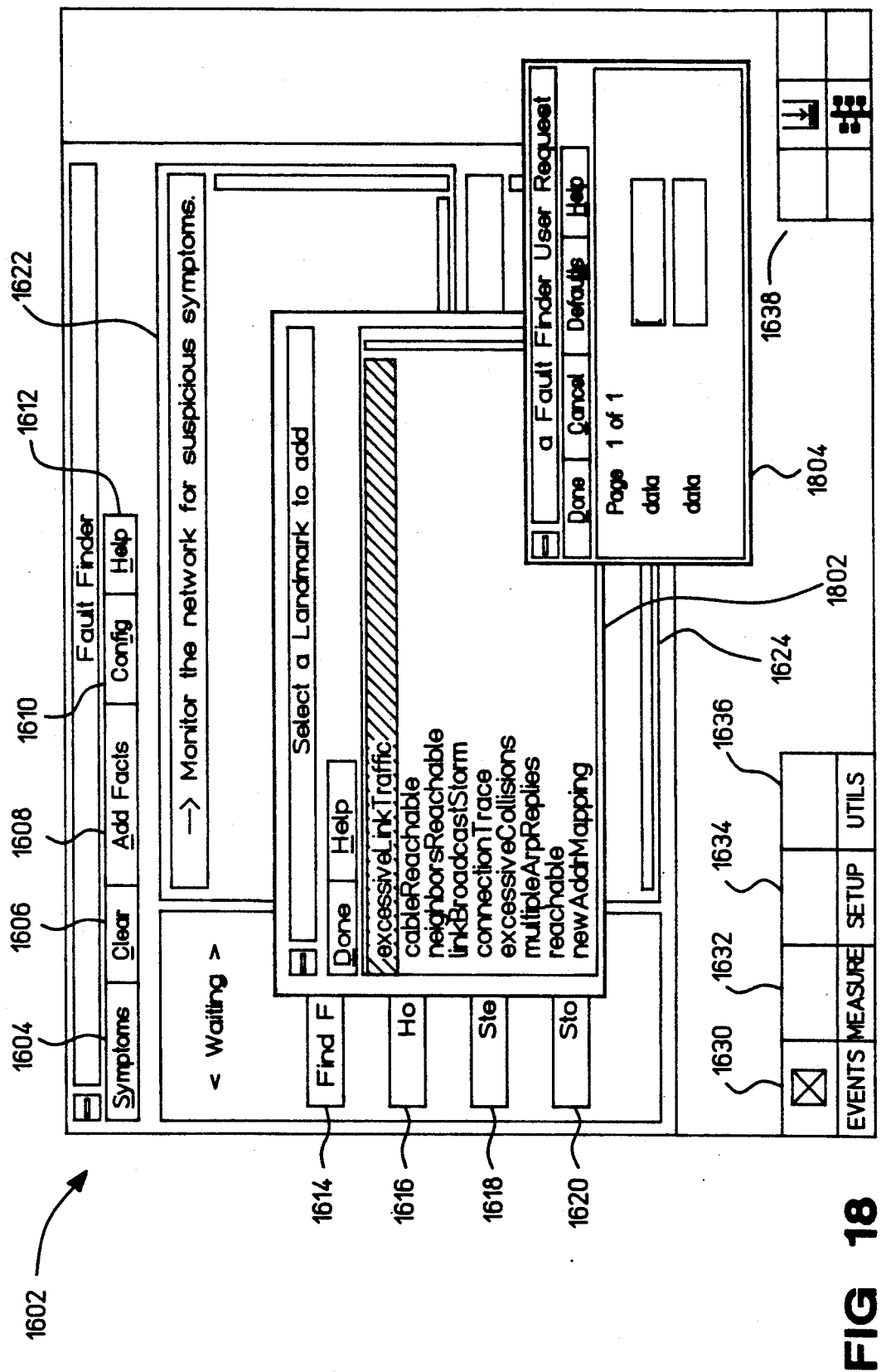
FIG. 18 illustrates a third terminal display image of a user interface module of the present invention.

Operators use the add facts button 1608 to send event/answers and data to the expert system 102. As shown in FIG. 18, the operator opens a window 1802 by clicking a pointing device (such as a mouse) over the add facts button 1608. The window 1802 lists answers which the operator may select. In the window 1802, the excessiveLinkTraffic answer is selected. By selecting the excessiveLinkTraffic answer, the operator opens window 1804. In window 1804, the operator can enter information related to the excessiveLinkTraffic answer.

Figure 17:
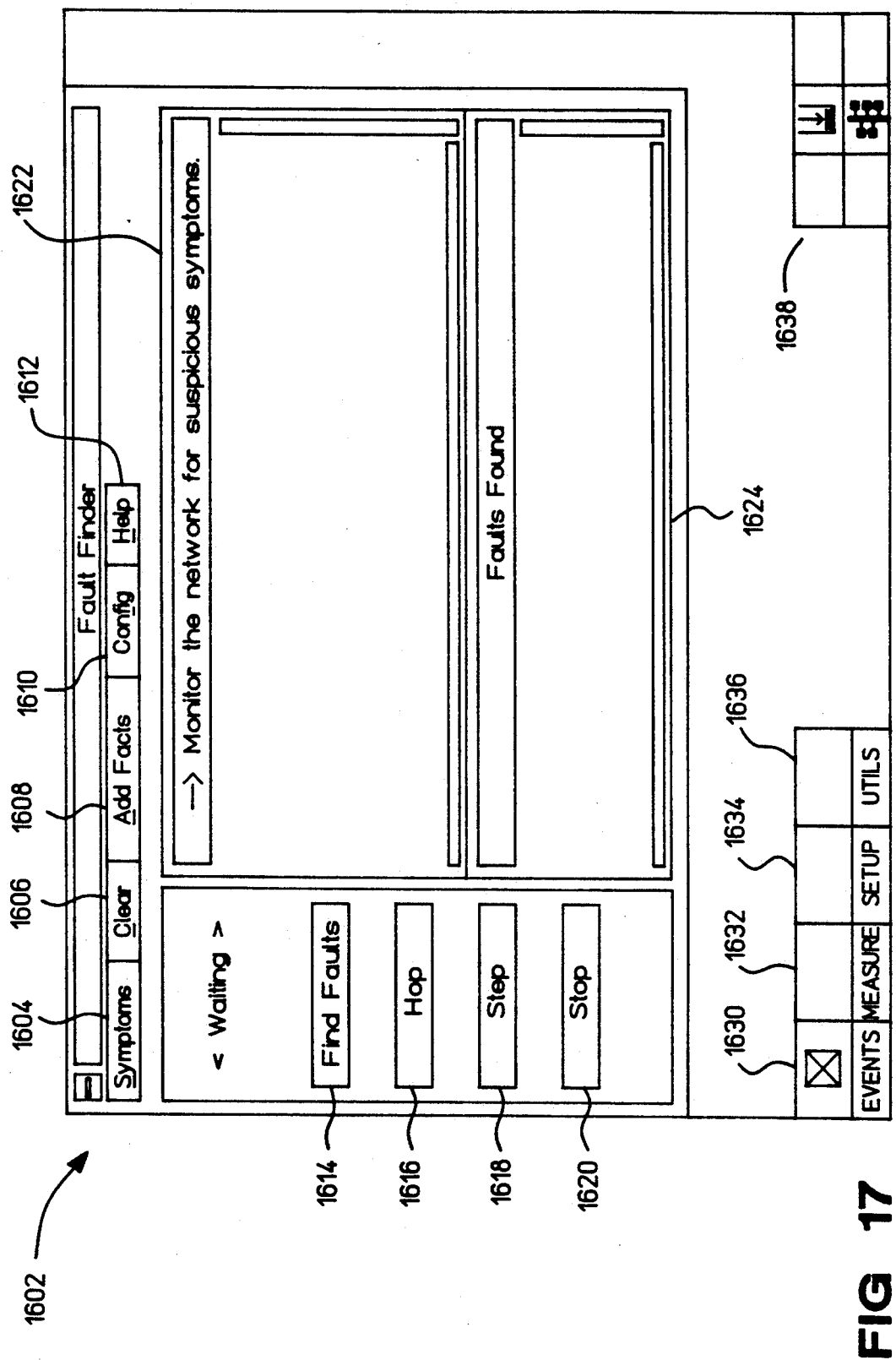
FIG. 17 illustrates a second terminal display image of a user interface module of the present invention.

Operators use the config button 1610 to configure the image 1602. For example, operators can use the config button 1610 to open and close windows. This is shown in FIG. 17, where the operator has used the config button 1610 to close the monitor and hypothesis windows 1626, 1628 and to enlarge the events and faults windows 1622, 1624.

The display screen image 1602 contains many help buttons, such as help button 1612. These help buttons are context sensitive and provide informative help messages to aid operators in interacting and controlling the expert system 102.

Operators use the command buttons 1614, 1616, 1618, 1620, 1698, 1699 to initiate and control diagnosis of the network 142.

Operators push the find faults button 1614 (by clicking the pointing device over the find faults button 1614) to begin diagnosing of the network 142. By pushing the find faults button 1614, the operator essentially causes the expert system to begin operating in a continuous looping process as shown at step 330 in FIG. 4.

Operators push the hop button 1616 and step button 1618 to diagnose the network 142 in incremental steps.

Operators push the stop button 1620 to stop operation of the expert system 102.

Operators use the icons 1630, 1632, 1634, 1636 to perform miscellaneous functions.

Specifically, operators use the events icon 1630 (by clicking over the events icon 1630) to view the events in the event log 106 according to categories.

Operators use the measure icon 1632 to directly control the protocol analyzer 138.

Operators use the setup icon 1634 to set global parameters and configuration, such as the type of network the expert system 102 is diagnosing.

Operators use the utils icon 1636 to perform such miscellaneous utilities as printing the screen.

Figure 19:
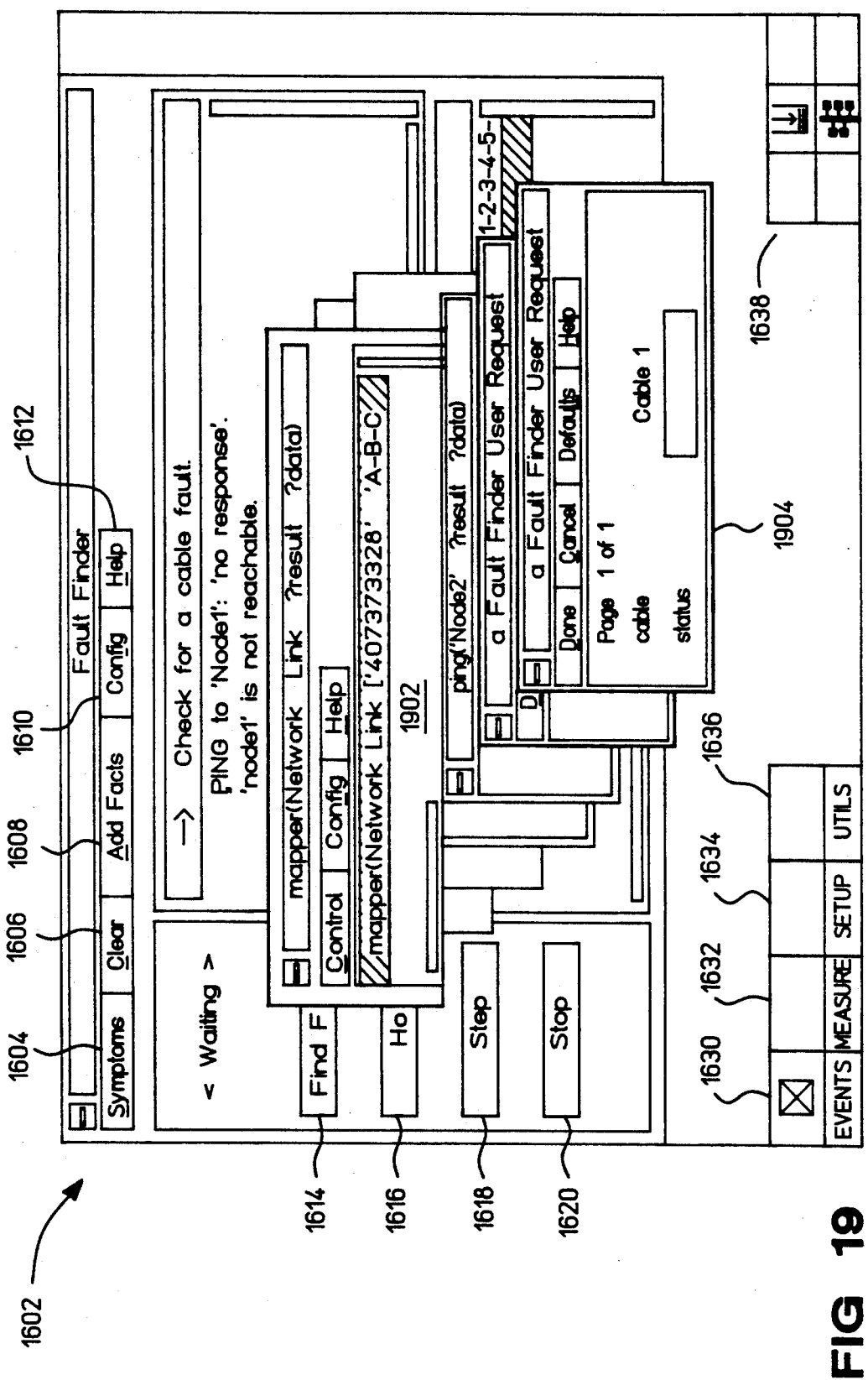
FIG. 19 illustrates a fourth terminal display image of a user, interface module of the present invention.

Operators can open multiple windows in the display screen image 1602. This is shown in FIG. 19.

Figure 20:
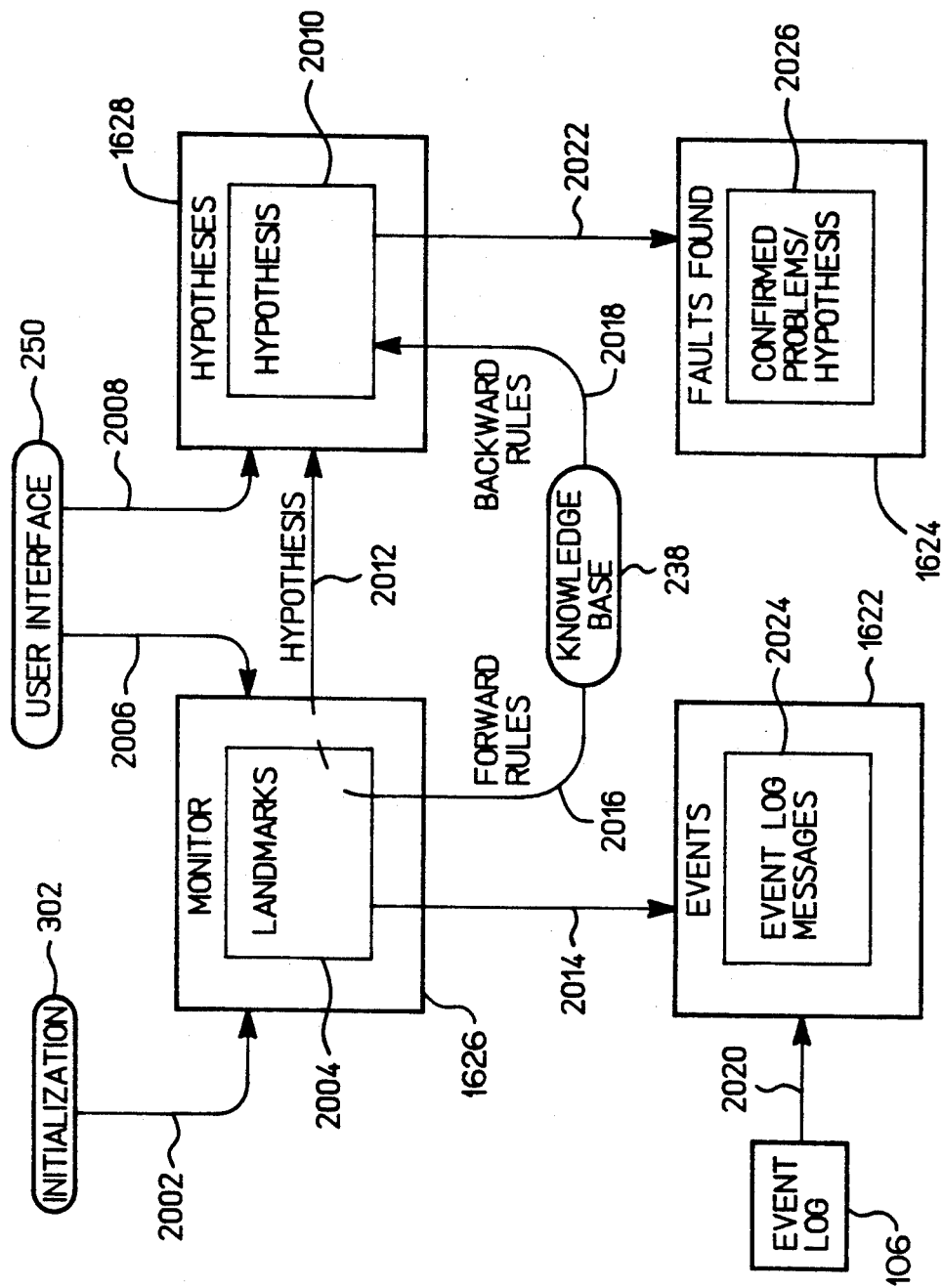
FIG. 20 illustrates the manner in which questions and data are displayed in and transferred between windows of a user interface module of the present invention.

FIG. 20 abstractly illustrates the manner in which questions and data are displayed in and transferred between the events window 1622, faults window 1624, monitor window 1626, and hypotheses window 1628. As shown in FIG. 20 and as described above, the events window 1622 displays event log messages. The faults window 1624 displays confirmed network problems/hypotheses. The monitor window 1626 displays questions from forward rules (in this context, also called landmarks). The hypotheses window 1628 displays hypothesized problem questions.

As described above with reference to FIG. 3, the initialization process 302 places questions from forward rules (from the knowledge base 238 on line 2016) dealing with proactive diagnosis into the blackboard 202 (line 2002). The questions from forward rules represent landmarks and are displayed in the monitor window 1626. Operators can also enter facts (that is, problems, data, and landmarks) into the blackboard 202 by using the symptoms and add facts button 1604, 1608 of the user interface 250 (line 2006).

Forward rules, if satisfied, yield problem questions. The backward rules from the knowledge base 238 confirm or reject the hypotheses of network problems.

The hypotheses window 1628 contains the hypothesized problems yielded from either the monitor window 1626 on line 2012 (that is, forward rules displayed in the monitor window 1626 which have been satisfied) or from operators Via the user interface 250 on line 2008 (specifically, from operators who have used the symptoms button 1604 or the add facts button 1608).

As noted above, the faults window 1624 displays confirmed network problems. This is graphically represented in FIG. 20 by line 2022.

3.4. ARPA Requirements

In a preferred embodiment of the present invention, the expert system 102 diagnoses local area networks (LAN), and in particular ARPA (Defense Advanced Research Projects Agency) data communication networks 142. ARPA operates on ethernet (IEEE standard 802.3), among others.

The expert system 102 of the present invention is not limited to diagnosing only LANs and ARPA data communication networks 142. The structure and operation of the expert system 102, as described herein, is applicable to the diagnosis of any data communication network 142. For example, the invention is currently being adapted to diagnose token ring data communication networks (conforming to IEEE 802.5).

In diagnosing the ARPA data communication network 142, the expert system 102 is capable of detecting and identifying a number of network problems, such as (1) network too long, (2) bad media, connector, or termination, (3) spanning device down, (4) duplicate IP address, (5) duplicate link address, (6) misconfigured IP broadcast address, (7) misconfigured IP mask, (8) incorrect IP address assignment, (9) route too long, routing loop, or TTL too low, (10) misconfigured forwarding parameter, and (11) RWHOD misconfigured.

In diagnosing the ARPA data communication network 142, the expert system 102 is also capable of detecting and reporting network observations. These network observations may indicate the existence of actual network problems, but not enough information is available regarding these network observations for the expert system 102 to conclusively determine that network problems exist. Operator interpretation is required.

The network observations which are detected by the expert system 102 include (1) excessive traffic, (2) trailers being used, (3) excessive ICMP messages, (4) excessive routing updates, (5) performance problem, (6) excessive retransmissions, and (7) security violations.

Many of the above network observations represent landmarks according to a preferred embodiment of the present invention.

To detect the above network problems and network observations, the expert system 102 is capable of performing a number of network measurements. The expert system 102 performs these network measurements by commanding the protocol analyzer 138 (via the measurement module 214C). The network measurements performed by the expert system 102 include (1) traffic-/utilization statistics, (2) collision statistics, (3) runts/-jabbers/FCS error statistics, (4) trigger/search, (5) generalized statistics, (6) broadcast traffic statistic, (7) ICMP statistics, (8) node statistics, (9) ARP (send), (10) Ping (send), (11) traffic by protocol, and (12) decode.

The expert system 102 is not limited to detecting only the network problems and network observations described above, nor is the expert system 102 limited to performing only the measurements described above. The discussion above is intended only to illustrate some of the capabilities of the present invention. Such capabilities are sufficient to diagnose the ARPA communication network 142. The expert system 102 is capable of performing the above and additional tasks in order to diagnose other types of data communication networks.

3.5. ARPA Rules

In this section, the rules contained in the knowledge base 238 for diagnosing data communication networks 142 are discussed. The rules discussed in this section are representative of the type that are necessary to diagnose ARPA networks, although the principles described herein are pertinent to diagnosing data communication networks of different types.

FIGS. 22A and 22C illustrate forward, or hypothesis, rules. These rules are used to generate hypotheses of network problems.

FIGS. 22B, 22D, and 22E illustrate backward rules. These rules are used to confirm hypotheses of network problems and identify landmarks.

FIG. 22A illustrates a forward rule which may be activated to hypothesize a network problem either during initialization 302 (for proactive diagnosis) or during user input via the user interface 250 (for reactive diagnosis). The facilitator 208 selects the rule module 214B (in step 942) to process the forward rule in FIG. 22A.

The forward rule in FIG. 22A pertains to a 'cableNoisy' hypothesis. This is indicated by the logicText field. The cableNoisy hypothesis depends on an 'excessiveCollisions' condition/question (note that 'baseline' is an internal command). If the excessiveCollisions condition is satisfied, then the forward rule shown in FIG. 22A is satisfied and a cableNoisy network problem may exist. In other words, the forward rule in FIG. 22A hypothesizes that a cableNoisy network problem may exist if the excessiveCollisions condition is satisfied.

The excessiveCollisions condition is identified via the backward rule illustrated in FIG. 22E. The rule module 214B associated with the forward rule in FIG. 22A creates and issues an event/question which will be addressed by the backward rule in FIG. 22E (in step 1350).

The facilitator 208 selects (in step 942) the rule module 214B to process the backward rule in FIG. 22E. Note that the backward rule in FIG. 22E includes 'collisionStat.' CollisionStat involves a collisions statistic measurement which is performed by the protocol analyzer 138.

In FIG. 22E, 'baseline,' 'findall,' 'size', and 'ge' are internal commands. The rule module 214B executes the baseline internal command (in step 1318) to determine the collisions threshold on the cable in question. Then the rule module 214B issues an event/question according to collisionStat (in step 1350).

The facilitator 208 selects the measurement module 214C to process the collisionStat event/question (in step 942). The measurement module 214C processes the collisionStat command (in steps 1106, 1110, 1114) to cause the protocol analyzer 138 to perform a collision statistics measurement ten times. The results of the collision statistics measurement are returned to the measurement module 214C in the 'results' parameter. The measurement module 214C issues an event/answer containing the results (in steps 1122, 1126).

The rule module 214B associated with the backward rule in FIG. 22E reads the event/answer containing the results of the collision statistics measurement (in step 1406). The rule module 214B executes the findall and size internal commands to determine the number of results which exceed the collisions threshold (in step 1410).

The rule module 214B then executes the ge (greater than or equal) internal command to determine if the number of results which exceed the collisions threshold is greater than or equal to 4 (in step 1410). If it is greater than or equal to 4, then the backward rule shown in FIG. 22E is satisfied (that is, there are excessive collisions on the cable in question). The rule module 214B issues an appropriate event/answer (in step 1430), indicating that there are excessive collisions on the cable in question. The rule module 214B associated with the backward rule in FIG. 22E is then complete.

It is not always necessary to process the backward rule shown in FIG. 22E to determine whether the excessiveCollisions condition (in the backward rule in FIG. 22A) is satisfied. An operator may enter data (via the user interface 250) that the cable in question has excessive collisions (the data would be left on the blackboard 202 in step 804 in anticipation of processing a rule such as the backward rule shown in FIG. 22A). If the operator enters such data, then the excessiveCollisions condition is satisfied.

The rule module 214B associated with the forward rule in FIG. 22A receives the event/answer (in step 1406) indicating that the excessiveCollisions condition is satisfied (as noted above, the event/answer may have been posted to the blackboard 202 via the backward rule in FIG. 22E or via user input). The rule module 214B executes the baseline internal command (in step 1410). Since the excessiveCollisions condition is satisfied, the forward rule shown in FIG. 22A is satisfied. Therefore, according to the forward rule in FIG. 22A, a cableNoisy network problem may exist. Since the forward rule in FIG. 22A is satisfied, the rule module 214B issues a 'cableNoisy' event/question. This is indicated by the logicText. The rule module 214B associated with the forward rule in FIG. 22A is then complete.

The cableNoisy backward rule associated with the cableNoisy event/question is shown in FIG. 22B. The cableNoisy backward rule is used for verifying or rejecting the hypothesis that a cableNoisy network problem may exist. As indicated by the statements under logicText, the backward rule illustrated in FIG. 22B depends on a 'noise' condition (or question). Noise refers to a user question. As indicated by a 'gt' (greater than) internal command, if the result of the noise question is greater than 2, then the cableNoisy hypothesis is verified and a cableNoisy network problem exists.

The facilitator 208 selects the rule module 214B (in step 942) to process the cableNoisy backward rule in FIG. 22B. The rule module 214B issues an event/question (in step 1350) relating to the noise user question.

The facilitator 208 selects the user questions module 214E (in step 942) to process the noise user question. Pursuant to the noise user question, the user questions module 214E asks an operator (in steps 1206, 1210) to test the amount of noise on the cable in question. The operator may test the cable using, for example, a voltmeter or multimeter. After testing the cable, the operator enters the test result via the user interface 250. The operator's test result is returned to the user questions module 214E (in step 1214) via a 'noise' parameter. The user questions module 214E issues an event/answer containing the test result (in steps 1218, 1222, 1226).

The rule module 214B associated with the cableNoisy backward rule in FIG. 22B receives the event/answer containing the test result (in step 1406). The rule module 214B executes the gt internal command. If the test result is greater than 2, then the cableNoisy hypothesis is verified and a cableNoisy network problem exists. In this case, the rule module 214B issues an appropriate event/answer (in step 1430) to inform the operator that a network problem exists.

If the test result is not greater than 2, then the cableNoisy hypothesis is rejected. In this case, the rule module 214B issues a pseudo event (in step 1436).

The forward and backward rules shown in FIGS. 22C and 22D operate in an analogous manner to the rules shown in FIGS. 22A, 22B, and 22E.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer-based method for diagnosing data communication networks, said method comprising the steps of:
   (a) detecting landmarks by interpreting network data collected from a communication network, comprising the steps of:
      (1) selecting one of said landmarks;
      (2) collecting first network data;
      (3) interpreting said first network data to determine whether said selected landmark exists;
      (4) identifying related landmarks if said selected landmark exists;
      (5) collecting second network data; and
      (6) interpreting said second network data to determine whether said related landmarks exist; and
   (b) interpreting said detected landmarks to determine whether network problems exist.

2. The method of claim 1, wherein step (b) comprises the steps of determining whether a sufficient combination of said related landmarks exist.

3. An apparatus for diagnosing data communication networks, said apparatus comprising:
   (1) means for detecting landmarks from a data communication network, comprising:
      (a) means for selecting one of said landmarks;
      (b) means for collecting first network data;
      (c) means for interpreting said first network data to determine whether said selected landmark exists;
      (d) means for identifying related landmarks if said selected landmark exists;
      (e) means for collecting second network data; and
      (f) means for interpreting said second network data to determine whether said related landmarks exist; and
   (2) means for interpreting said detected landmarks to determine whether network problems exist.

4. The apparatus of claim 3, wherein element (2) comprises means for determining whether a sufficient combination of said related landmarks exist.

5. A computer-based method for diagnosing data communication networks, said method comprising the steps of:
   (a) collecting network data;
   (b) interpreting said network data to determine whether first landmarks exist;
   (c) interpreting said existing first landmarks to determine whether second landmarks exist; and
   (d) interpreting said existing first and second landmarks to determine whether network problems exist.

6. The method of claim 6, wherein said first and second landmarks comprise interpretations of said network data, and provide indications of said network problems.

7. The method of claim 5, wherein steps (a) and (b) collectively comprise the steps of:
   (1) selecting one of said first landmarks;
   (2) collecting first network data;
   (3) interpreting said first network data to determine whether said selected first landmark exists;
   (4) identifying related landmarks if said selected first landmark exists;
   (5) collecting second network data; and
   (6) interpreting said second network data to determine whether said related landmarks exist.

8. The method of claim 7, wherein step (d) comprises the step of determining whether a sufficient combination of said related and second landmarks exist.

9. The method of claim 5, wherein said data communication networks comprise ARPA networks.

10. The method of claim 5, wherein said method operates in an expert system.

11. An apparatus for diagnosing data communication networks, said apparatus comprising:
    (1) means for collecting network data;
    (2) means for interpreting said network data to determine whether first landmarks exist;
    (3) means for interpreting said existing first landmarks to determine whether second landmarks exist; and
    (4) means for interpreting said existing first and second landmarks to determine whether network problems exist.

12. The apparatus of claim 11, wherein said first and second landmarks comprise interpretations of said network data, and provide indications of said network problems.

13. The apparatus of claim 11, wherein element (1) comprises:
    (a) means for collecting first network data; and
    (b) means for collecting second network data.

14. The apparatus of claim 13, wherein element (2) comprises:
(a) means for selecting one of said first landmarks;
(b) means for interpreting said first network data to determine whether said selected first landmark exists;
(c) means for identifying related landmarks if said selected first landmark exists; and
(d) means for interpreting said second network data to determine whether said related landmarks exist.

15. The apparatus of claim 14, wherein element (3) comprises means for determining whether a sufficient combination of said related and second landmarks exist.

16. The apparatus of claim 11, wherein said data communication networks comprise ARPA networks.

17. The apparatus of claim 11, wherein said apparatus comprises an expert system.

* * * * *